US009201607B2

(12) United States Patent
Satoyama et al.

(10) Patent No.: US 9,201,607 B2
(45) Date of Patent: *Dec. 1, 2015

(54) COMPUTER SYSTEM AND METHOD FOR BALANCING USAGE RATE OF POOL VOLUMES

(71) Applicant: HITACHI, LTD., Tokyo (JP)

(72) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,031

(22) Filed: May 30, 2014

(65) Prior Publication Data

US 2014/0281339 A1    Sep. 18, 2014

Related U.S. Application Data

(63) Continuation of application No. 13/964,185, filed on Aug. 12, 2013, now Pat. No. 8,769,235, which is a continuation of application No. 12/594,648, filed as application No. PCT/JP2009/058533 on Apr. 23, 2009, now Pat. No. 8,516,215.

(51) Int. Cl.
*G06F 12/02* (2006.01)
*G06F 9/50* (2006.01)
*G06F 3/06* (2006.01)

(52) U.S. Cl.
CPC ............ *G06F 3/0647* (2013.01); *G06F 3/0605* (2013.01); *G06F 3/067* (2013.01); *G06F 3/0619* (2013.01); *G06F 3/0665* (2013.01); *G06F 3/0689* (2013.01); *G06F 12/02* (2013.01)

(58) Field of Classification Search
CPC ... G06F 3/0619; G06F 3/0605; G06F 3/0647; G06F 3/0665; G06F 3/067; G06F 3/0689; G06F 2206/1012; G06F 12/02; G06F 2212/1044; G06F 2212/152; G06F 2212/261
See application file for complete search history.

(56) References Cited

U.S. PATENT DOCUMENTS

| 5,666,511 A | 9/1997 | Suganuma et al. |
| 5,987,569 A | 11/1999 | Takahashi et al. |
| 6,401,182 B1 * | 6/2002 | Sweeney ...................... 711/171 |
| 6,857,059 B2 | 2/2005 | Karpoff et al. |

(Continued)

FOREIGN PATENT DOCUMENTS

| JP | 1-191221 | 8/1989 |
| JP | 04-038540 | 2/1992 |

(Continued)

OTHER PUBLICATIONS

English language translation of relevant portions for the Japanese Office Action dated May 14, 2013 received in corresponding Japanese Application No. 2011-510141.

(Continued)

*Primary Examiner* — Michael Krofcheck
(74) *Attorney, Agent, or Firm* — Mattingly & Malur, PC

(57) ABSTRACT

The computer system, during the course of executing an operation of dynamically allocating a storage area to a virtual volume in response to an access from a host system, detects where a balance of a storage capacity among a plurality of logical areas is disrupted, and subsequently moves a storage area among a plurality of logical areas to maintain balance of the storage capacity.

20 Claims, 45 Drawing Sheets

(56) References Cited

U.S. PATENT DOCUMENTS

| | | |
|---|---|---|
| 7,181,578 B1 | 2/2007 | Guha et al. |
| 8,266,191 B1 * | 9/2012 | Aggarwal et al. ............ 707/820 |
| 2003/0046491 A1 | 3/2003 | Katsurashima |
| 2003/0126394 A1 * | 7/2003 | Fowler ........................ 711/170 |
| 2004/0162958 A1 | 8/2004 | Kano et al. |
| 2005/0262038 A1 | 11/2005 | Sepez et al. |
| 2006/0277386 A1 | 12/2006 | Eguchi |
| 2007/0033368 A1 | 2/2007 | Taguchi et al. |
| 2007/0078961 A1 | 4/2007 | Kumano et al. |
| 2007/0118689 A1 | 5/2007 | Hyde, II et al. |
| 2007/0168565 A1 | 7/2007 | Yuhara et al. |
| 2008/0010422 A1 | 1/2008 | Suzuki et al. |
| 2008/0109616 A1 | 5/2008 | Taylor |
| 2008/0126734 A1 | 5/2008 | Murase |
| 2008/0162810 A1 | 7/2008 | Taguchi et al. |
| 2008/0235448 A1 | 9/2008 | Inoue et al. |
| 2008/0244596 A1 * | 10/2008 | Mansker et al. ............. 718/104 |
| 2009/0043982 A1 | 2/2009 | Kano et al. |
| 2009/0055593 A1 | 2/2009 | Satoyama et al. |
| 2009/0055613 A1 | 2/2009 | Maki et al. |
| 2009/0094403 A1 * | 4/2009 | Nakagawa et al. ................ 711/6 |
| 2010/0077158 A1 * | 3/2010 | Asano et al. ................. 711/154 |

FOREIGN PATENT DOCUMENTS

| | | |
|---|---|---|
| JP | 6-119125 | 4/1994 |
| JP | 06-187227 | 7/1994 |
| JP | 8-221326 | 8/1996 |
| JP | 2003-5920 | 1/2003 |
| JP | 2003-15915 | 1/2003 |
| JP | 2003-186712 | 7/2003 |
| JP | 2003-186713 | 7/2003 |
| JP | 2006-338341 | 12/2006 |
| JP | 2007-79885 | 3/2007 |
| JP | 2007-179156 | 7/2007 |
| JP | 2008-15768 | 1/2008 |
| JP | 2008-165620 | 7/2008 |
| JP | 2008-234158 | 10/2008 |
| JP | 2009-48497 | 3/2009 |
| JP | 2009-48514 | 3/2009 |

OTHER PUBLICATIONS

English language translation of relevant portions for the Japanese Office Action dated May 14, 2013 received in corresponding Japanese Application No. 2011-510144.

* cited by examiner

FIG.16A

POOL MANAGEMENT TABLE

| POOL # | CAPACITY NUMBER OF PAGES | USAGE AMOUNT NUMBER OF PAGES | BELONGING POOL VOL NUMBER |
|---|---|---|---|
| | | | |

FIG.16B

POOL VOL MANAGEMENT TABLE

| POOL # | CAPACITY NUMBER OF PAGES | USAGE AMOUNT NUMBER OF PAGES | BELONGING POOL VOL NUMBER |
|---|---|---|---|
| | | | |

FIG.16C

FREE QUEUE UNIT MANAGEMENT TABLE

| FREE QUEUE # | POOL VOL # MANAGED BY FREE QUEUE | NUMBER OF POOL VOLUMES LINKED TO FREE QUEUE | BELONGING POOL NUMBER |
|---|---|---|---|
| | | | |

FIG.18

ALLOCATION ORDER MANAGEMENT TABLE

| FREE QUEUE # | ALLOCATION RATIO | FREQUENCY OF ALLOCATION | |
|---|---|---|---|
| 0 | 2 | 2 | |
| 1 | 3 | 2 | ⇐ COUNTER |
| 2 | 2 | 0 | |

FIG.21

| HDP #0 POOL VOLs | | |
|---|---|---|
| POOL VOL # | NUMBER OF MIGRATED PAGES | MIGRATION SOURCE OR DESTINATION? |
| 0 | 0 | — |
| 1 | 0 | — |
| 2 | 0 | — |
| 3 | 0 | — |

| HDP #1 POOL VOLs, AMOUNT OF MIGRATION | | |
|---|---|---|
| POOL VOL # | NUMBER OF MIGRATED PAGES | MIGRATION SOURCE OR DESTINATION? |
| 0 | 1 | MIGRATION DESTINATION |
| 1 | 1 | MIGRATION SOURCE |
| 2 | 2 | MIGRATION DESTINATION |
| 3 | 2 | MIGRATION SOURCE |

| HDP #2 POOL VOLs, AMOUNT OF MIGRATION | | |
|---|---|---|
| POOL VOL # | NUMBER OF MIGRATED PAGES | MIGRATION SOURCE OR DESTINATION? |
| 0 | 1 | MIGRATION SOURCE |
| 1 | 1 | MIGRATION DESTINATION |
| 2 | 0 | — |
| 3 | 0 | — |

FIG.22

| DETAILS OF POOL VOLS OF PAGES ALLOCATED TO HDP VOL #0 | | | | |
|---|---|---|---|---|
| POOL VOL # | ALLOCATION RATIO | NUMBER OF ALLOCATED PAGES | NUMBER OF IDEAL ALLOCATED PAGES | ALLOCATION BALANCE |
| 0 | 2 | 2 | 4 | 2/4 |
| 1 | 3 | 6 | 6 | 6/6 |
| 2 | 2 | 5 | 4 | 5/4 |
| 3 | 2 | 6 | 4 | 6/4 |
| TOTAL NUMBER OF PAGES ALLOCATED FROM POOL | | 18 | | |

DP VOL CREATION

PAGE ALLOCATION

ZERO "0" DATA PAGE DISCARD PROCESSING

FIG.36

MIGRATION PROGRESS MANAGEMENT TABLE

| POOL # | NUMBER OF MIGRATION TARGET HDP VOLS | NUMBER O ALREADY MIGRATED HDP VOLS | POOL STATUS |
|---|---|---|---|

| POOL VOL # | NUMBER OF MIGRATION TARGET PAGES | NUMBER OF PAGES REMAINING AFTER MIGRATION | |
|---|---|---|---|

FIG.38

| POOL # | POOL STATUS | POOL CAPACITY (GB) | POOL USAGE AMOUNT (GB) | UNUSED POOL CAPACITY (GB) |
|---|---|---|---|---|
| 0 | SHRINK IN PROGRESS | × × × | × × × | × × × |
| 1 | SHRINK NOT PERFORMED | | | |
| 2 | | | | |
| | | | | |

| POOL #0 | | | | |
|---|---|---|---|---|
| POOL VOL # | POOL VOL STATUS | POOL VOL CAPACITY (GB) | POOL VOL USAGE AMOUNT (GB) | UNUSED POOL VOL CAPACITY (GB) |
| 0 | NORMAL | × × × | × × × | × × × |
| 1 | BLOCKED | | | |
| | | | | |

FIG.39

| POOL # | BEFORE SHRINK | | | | AFTER SHRINK(PRESUMED) | | | |
|---|---|---|---|---|---|---|---|---|
| | POOL CAPACITY (GB) | POOL USAGE AMOUNT (GB) | UNUSED POOL CAPACITY (GB) | UNUSED CAPACITY RATE (%) | POOL CAPACITY (GB) | POOL USAGE AMOUNT (GB) | UNUSED POOL CAPACITY (GB) | UNUSED CAPACITY RATE (%) |
| 0 | x x x | x x x | x x x | | x x x | x x x | x x x | |

COMPUTER SYSTEM AND METHOD FOR BALANCING USAGE RATE OF POOL VOLUMES

This is a continuation application of U.S. Ser. No. 13/964,185, filed Aug. 12, 2013 which is a continuation of Ser. No. 12/594,648, filed Oct. 5, 2009, (U.S. Pat. No. 8,516,215). This application claims priority from National Stage of PCT/JP2009/058533, filed Apr. 23, 2009. The entire disclosures of these applications are hereby incorporated by reference.

TECHNICAL FIELD

This invention relates to a computer system, specifically to a computer system which dynamically allocates storage capacity to host devices.

BACKGROUND ART

Conventionally, a computer system providing a large-scale data storage service to the host devices exists. This system is known to include host devices, a storage apparatus to which the host devices are connected, and a management apparatus of the storage apparatus.

The storage apparatus manages multiple hard disks by the RAID (Redundant Array of Independent/Inexpensive Disks) method. The storage apparatus logicalizes physical storage areas included in multiple hard disks and provides them as logical volumes to the host devices. The host devices access the logical volumes and request the reading and writing of data.

One of the logicalization technologies of this type is called thin provisioning. The storage apparatus sets a virtual volume, which does not include any physical storage areas, for the host devices. As the host devices make write accesses to the virtual volume, the storage apparatus sequentially allocates storage areas to the virtual volume.

Therefore, this technology is more effective, compared with the method of allocating a large capacity storage area to logical volumes from the beginning, in that storage resources can be efficiently utilized. This technology is disclosed in Japanese Examined Patent Application Publication No. 2003-015915A and Japanese Unexamined Patent Application Publication No. 2006-338341A.

The means for providing storage areas to the virtual volume consists of a logical group, called a pool, of multiple logical volumes to each of which physical storage areas are allocated. Each of the multiple logical volumes is called a pool volume. If there is a write access from the host device to the virtual volume, the storage area in the corresponding area of the pool volume is allocated to the access destination of the virtual volume.

The storage apparatus can store write data from the host device by making the area accessed by the host device for the virtual volume correspond with the area in the pool volume to which the storage capacity is allocated.

Though the storage apparatus intends to allocate storage areas to the multiple pool volumes equally, with the passage of time, the problem arises that this equality is impaired. Therefore, Japanese Unexamined Patent Application Publication No. 2008-234158A discloses that, by migrating storage areas among multiple pool volumes, the storage area capacity becomes equal among the multiple pool volumes.

Note that U.S. Pat. No. 6,857,059B discloses that, if there is a read access to an unallocated area of the virtual volume, the storage system responds to the host computer by creating a fixed pattern all configured of zero "0" by the program and that, if there is a write access to an unallocated area of the virtual volume, the storage system allocates a storage area.

CITATION LIST

Patent Literature (PTL)

PTL 1 Japanese Examined Patent Application Publication No. 2003-015915A
PTL 2 Japanese Unexamined Patent Application Publication No. 2006-338341A
PTL 3 Japanese Unexamined Patent Application Publication No. 2008-234158A
PTL 4 U.S. Pat. No. 6,857,059B

SUMMARY OF INVENTION

Technical Problem

Japanese Unexamined Patent Application Publication No. 2008-234158A, though disclosing that storage areas are migrated by the external operation, did not go far enough to propose the immediate and reliable equalization of storage capacity among multiple pool volumes. For example, only by discarding fixed data from the pool volume, the equalization of storage capacity among multiple pool volumes might become damaged.

Therefore, an object of this invention is to provide a computer system capable of performing the immediate and reliable equalization of storage capacity to multiple real logical areas that dynamically provides storage capacity to virtual logical areas.

Furthermore, another object of this invention is to provide a computer system capable of maintaining the equalization of storage capacity to multiple real logical areas dynamically providing storage capacity to virtual logical areas even in cases when changes in the data amount of real logical areas are inevitable such as when deleting fixed pattern data.

Solution to Problem

In order to achieve the foregoing objects, this invention provides a computer system which, during the course of executing an operation of dynamically allocating a storage area to a virtual volume in response to an access from a host system, detects an occasion where balance of a storage capacity among a plurality of logical areas is disrupted; and subsequently moves the storage area among a plurality of logical areas to maintain balance of the storage capacity.

This invention is, furthermore, characterized by being a computer system which intends to maintain the balance of storage capacity among the multiple storage areas while deleting fixed pattern data from the logical areas.

Advantageous Effects of Invention

This invention can provide a computer system performing the immediate and reliable equalization of storage capacity to multiple physical storage areas dynamically providing storage capacity to virtual logical areas.

Furthermore, this invention can provide a computer system maintaining the equalization of storage capacity to multiple real logical areas dynamically providing storage capacity to virtual logical areas even in cases where the changes in the data amount of real logical areas are inevitable such as deleting fixed pattern data.

BRIEF DESCRIPTION OF DRAWINGS

FIG. 16A is a table for managing a pool, FIG. 16B is a table for managing a pool volume, and FIG. 16C is a table for managing an unused queue unit.

FIG. 18 is a table for managing this allocation order.

FIG. 21 is a management table for achieving the migration mode shown in FIG. 20.

FIG. 22 is a page allocation balance management table.

FIG. 36 is a management table for managing the progress of the migration.

FIG. 38 is an example of shrink information provided to the user by the GUI.

FIG. 39 is an output example of the presumed results of a shrink.

DESCRIPTION OF EMBODIMENTS

Figure 1:
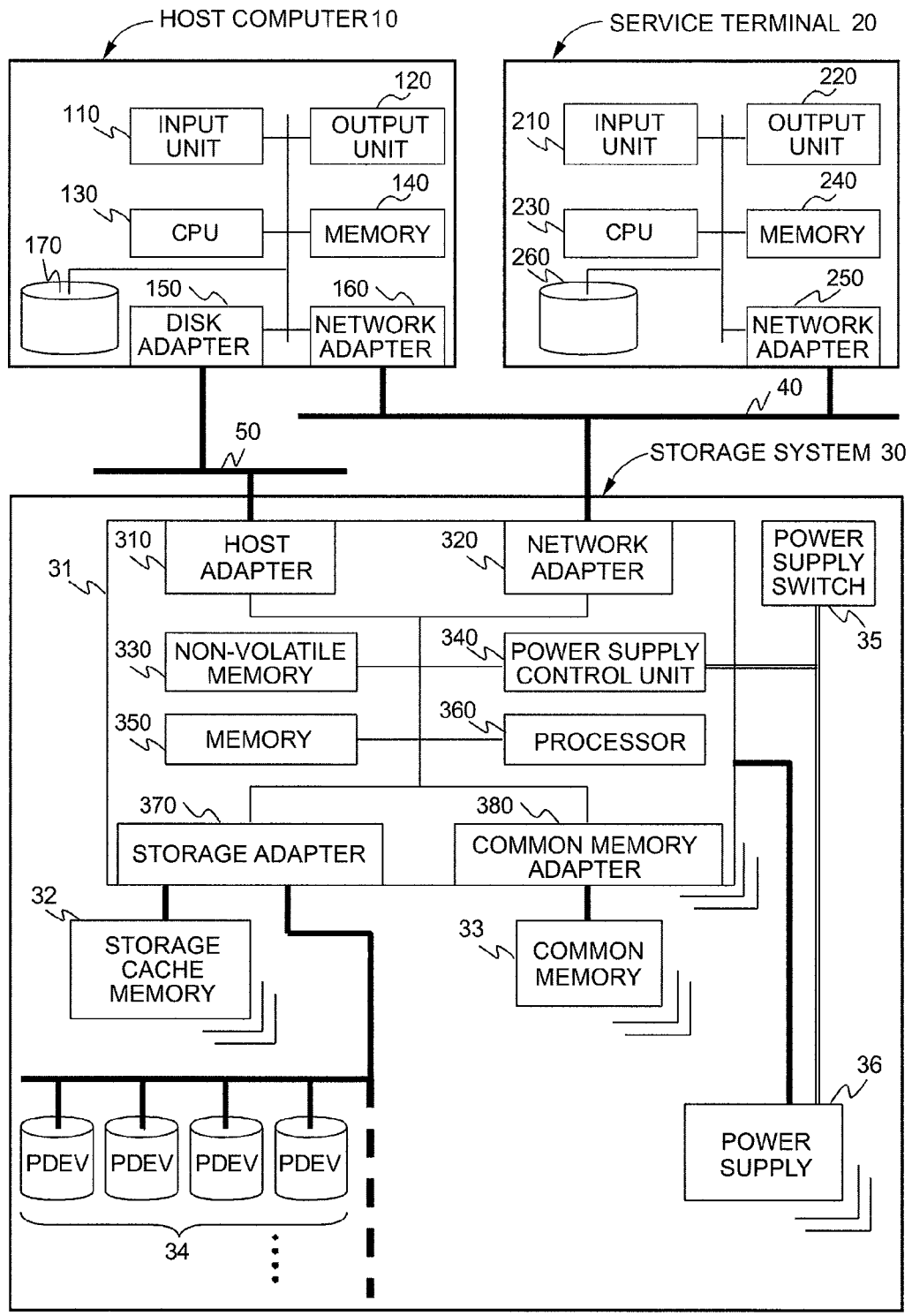
FIG. 1 is a hardware block diagram showing a first example of the computer system related to this invention.

An embodiment of this invention is described below. FIG. 1 is a hardware block diagram showing the first example of a computer system related to this invention. The computer system includes a host computer 10, a management apparatus 20, and a storage apparatus 30 to which the above-mentioned devices are connected. The storage apparatus is also referred to as a storage system or a storage subsystem.

The host computer 10 accesses the logical storage resources of the storage apparatus 30. The management apparatus 20 manages the configuration of the storage areas in the storage apparatus 30. The storage apparatus 30 stores data in the storage areas set in physical devices 34.

The host computer 10 includes an input means 110, an output means 120, a CPU 130, a memory 140, a disk adapter 150, a network adapter 160, and a disk drive 170. The input means 110 is a means for accepting inputs from the administrator operating the host computer 10 and others. The input means 110 is configured of, for example, a keyboard. The output means 120 is a means for displaying the status and the setting items of the host computer 10. The output means 120 is configured of, for example, a display device.

The CPU 130 reads the programs stored in the disk drive 170 to the memory 140, and performs the processing specified by the programs. The memory 140 is configured of, for example, a RAM and others, and stores programs, data, and others.

The disk adapter 150 is connected to the storage apparatus 30 via a storage network 50, and sends and receives data to and from the storage apparatus 30. The storage network 50 is configured of protocols suitable for data transfer (e.g., Fibre Channel).

The network adapter 160 sends and receives data to and from the storage system management apparatus 20 or the storage apparatus 30 via a management network 40. The management network 40 is configured of, for example, Ethernet.

The disk drive 170 is configured of, for example, a hard disk device, and stores data and programs.

The management apparatus 20 includes an input means 210, an output means 220, a CPU 230, a memory 240, a network adapter 250, and a disk drive 260.

The input means 210 is a means for accepting inputs from the administrator operating the management apparatus 20 and others. The input means 210 is configured of, for example, a keyboard. The output means 220 is a means for displaying the status and the setting items of the management apparatus 20. The output means 220 is configured of, for example, a display device.

The CPU 230 reads the management programs stored in the disk drive 260 to the memory 240, and performs the management processing for the storage apparatus based on the programs. The memory 240 is configured of, for example, a RAM and others, and stores programs, data, and others.

The network adapter 250 sends and receives data to and from the host computer 10 or the storage apparatus 30 via the management network 40.

The disk drive 260 is configured of, for example, a hard disk device, and stores data and programs.

The storage apparatus 30 includes a controller 31, a storage cache memory 32, a shared memory 33, physical devices (PDEVs) 34, a power supply switch 35, and a power supply 36. The controller 31 controls the storage of data in storage areas configured in the PDEVs 34. The storage cache memory 32 temporarily stores the data read from and written into the PDEVs 34. The shared memory 33 stores the configuration information of the controller 31 and the PDEVs 34. The PDEVs 34 are configured of multiple disk devices. The power supply 36 supplies power to each unit in the storage apparatus 30. The power supply switch 35 is the switch for turning on and off the power supply from the power supply 36. The disk devices (storage apparatuses) are configured of, for example, hard disk drives, and mainly store user data. As the storage apparatuses, drives configured of a semiconductor memory such as a flash memory may also be used.

The controller 31 is configured of a host adapter 310, a network adapter 320, a nonvolatile memory 330, a power supply control unit 340, a memory 350, a processor 360, a storage adapter 370, and a shared memory adapter 380.

The host adapter 310 sends and receives data to and from the host computer 10 via the storage network 50. The network adapter 320 sends and receives data to and from the host computer 10 or the management apparatus 20 via the storage network 40.

The nonvolatile memory 330 is configured of hard disks or flash memory, and stores the programs operating in the controller 31 and the configuration information. The power supply control unit 340 controls power supplied by the power supply 36.

The memory 350 is configured of, for example, RAM and others, and stores programs, data and others. The processor 360 reads the programs stored in the nonvolatile memory 330 to the memory 350, and performs the processing specified by the programs.

The storage adapter 370 sends and receives data to and from the PDEVs 34 and the storage cache memory 32. The shared memory adapter 380 sends and receives data to and from the shared memory 33.

Figure 2:
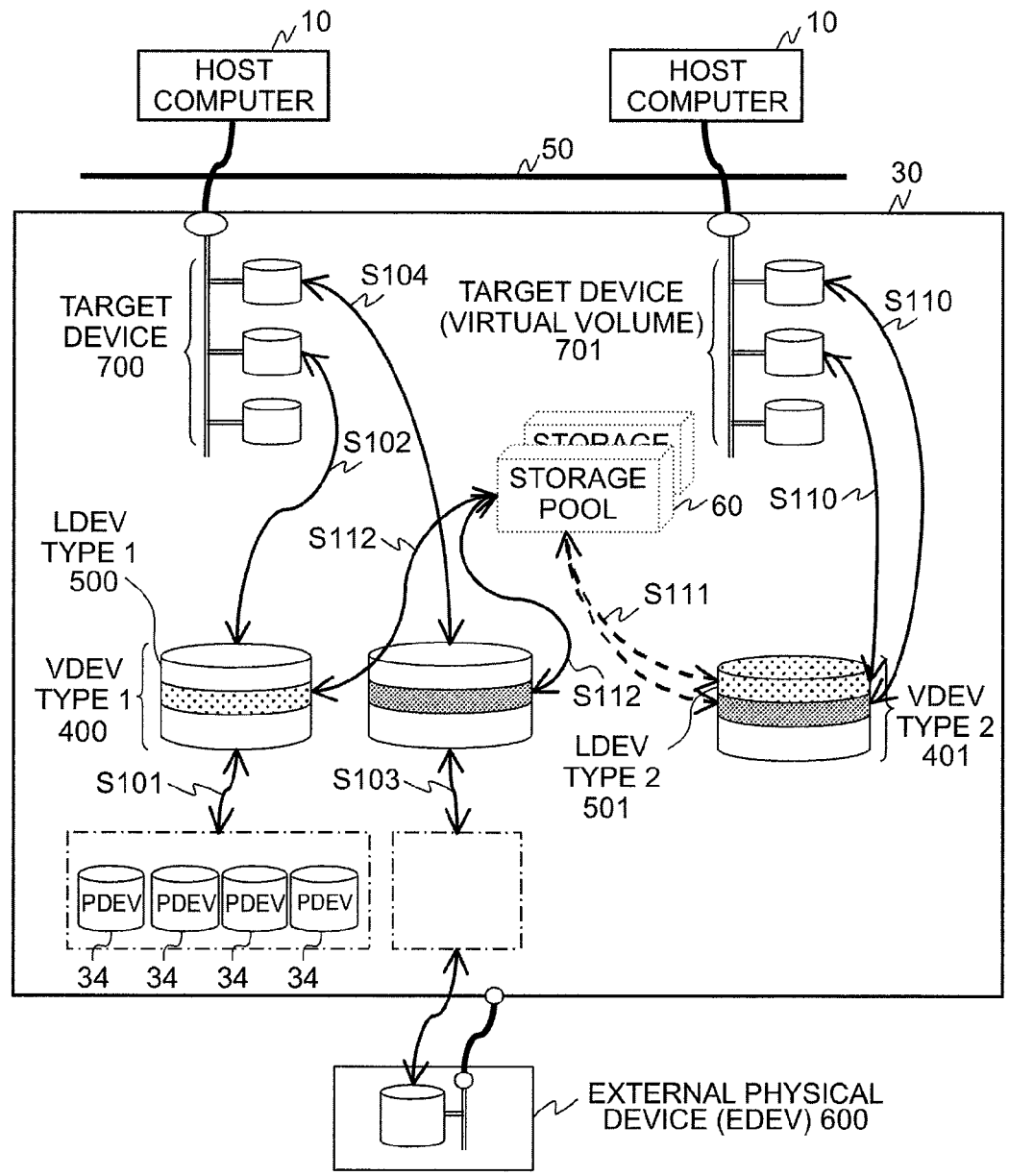
FIG. 2 is a function block diagram showing the operation of dynamically allocating storage areas performed by the storage apparatus in the computer system shown in FIG. 1.

FIG. 2 is a function block diagram showing the operation of dynamically allocating storage areas performed by the storage apparatus 30 in the computer system shown in FIG. 1. From the PDEVs 34, a RAID group is configured by the RAID configuration. From this RAID group, a virtual device (VDEV) 400 is configured (S101). The VDEV 400 is split into multiple logical devices (LDEVs) 500 which are storage areas. The VDEV configured of PDEVs 34 is called a "Type 1 VDEV." The LDEVs included in this Type 1 VDEV are called "Type 1 LDEVs."

The host computer 10 accesses the volumes (logical areas) in the storage apparatus 30. The volumes seen from the host computer 10 are called "target devices." The target devices 700 are set by defining a path in the volume including the Type 1 LDEVs to the host computer 10 (S102).

External physical devices 600 connected outside the storage apparatus 30 may also be treated the same as the PDEVs 34. That is, by the RAID configuration, multiple Type 1 VDEVs 400 are configured from multiple external physical devices (EDEVs) 600 (S103). The Type 1 VDEVs 400 are split into one or more storage areas; i.e., Type 1 LDEVs 500. The target devices 700 are set by setting a path in this Type 1 LDEV 500 to the host computer 10 (S104).

Furthermore, in the storage apparatus 30, a Type 2 VDEV 401 can be set. The Type 2 VDEV is, unlike the Type 1 VDEV configured of the PDEVs 34, a virtual device including an address and an area but not including any areas corresponding with the PDEVs 34. It is possible to set a cache memory area for a Type 2 VDEV. For this Type 2 VDEV 401, one or more LDEVs are configured. This LDEV is called a Type 2 LDEV 501.

The target devices 701 are set by setting a path in this Type 2 LDEV 501 to the host computer 10 (S110). These target devices correspond with the virtual volumes.

To Type 2 VDEVs and Type 2 LDEVs, physical storage areas are not allocated from the PDEVs (they do not have any storage areas). For the host computer 10 to use them, the Type 2 LDEVs must be associated with storage pools (or simply called "pools") 60.

The storage pools 60 are groups of one or more Type 1 LDEVs 500 that are coordinated by the storage pool attribute. The Type 1 LDEV 500 is allocated to the storage pool (S112). The Type 1 LDEV 500 is a pool volume.

This Type 1 LDEV 500 set as a storage pool is associated with the Type 2 LDEV 501 by using an address (S111). This association is called "mapping" or "allocation."

Consequently, the host computer 10 can make write/read accesses to and from the virtual volumes. Furthermore, by changing the mapping between the Type 1 LDEV and the Type 2 LDEV, the storage areas of the virtual volumes can be changed.

Figure 3:
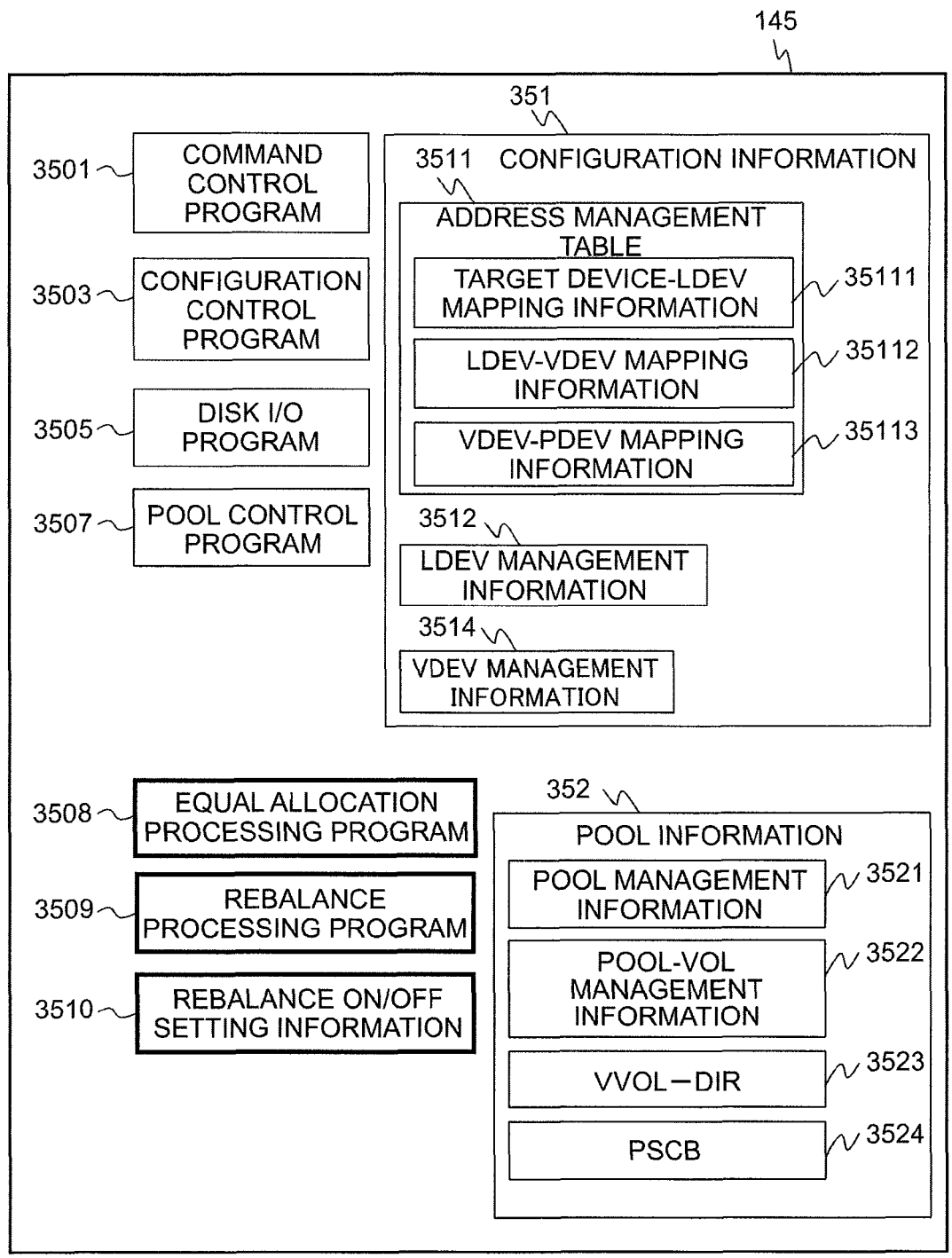
FIG. 3 is a memory block diagram of the storage apparatus.

FIG. 3 is a block diagram of a memory 350 in the storage apparatus 30. The memory 350 stores various types of programs read and performed by the processor 360, the configuration information 351 related to the LDEV settings, and the pool information 352 related to the storage pool settings.

The command control program 3501 interprets commands from the host computer 10 or the management apparatus 20, and performs the processing specified by the commands. The configuration control program 3503 controls the configuration of the storage apparatus 30. The disk I/O program 3505 controls accesses to the PDEVs 34. The pool control program 3507 sets storage pools.

The configuration information 351 stores the settings related to the VDEVs and LDEVs in the storage apparatus 30. The pool information 352 stores the settings related to the storage pools.

The configuration information 351 includes the address management table 3511, the LDEV management information 3512, and the VDEV management information 3514.

The address management table 3511 stores the address mapping information among target devices, LDEVs, VDEVs, and physical devices. The address management table 3511 includes the target device-LDEV mapping information 35111, the LDEV-VDEV mapping information 35112, and the VDEV-PDEV mapping information 35113. The LDEV management information 3512 stores the information related to the LDEVs. The VDEV management information 3514 stores the information related to virtual logical volumes.

The pool information 352 includes the POOL management information 3521, the POOL-VOL management information 3522, the VVOL-DIR 3523, and the PSCB 3524. The POOL management information 3521 stores the settings of the storage pools. The POOL-VOL management information 3522 stores the information of the volumes in the storage pools. The VVOL-DIR 3523 stores the address allocation to the LDEVs in the storage pools. The PSCB 3524 stores the information of the addresses of the LDEVs in the storage pools.

Furthermore, the memory 350 includes the allocation processing program 3508 for equally allocating storage areas from the PDEVs to the multiple LDEVs (pool volumes) 500 belonging to the storage pools and the rebalance processing program 3509 for equalizing the storage capacity of multiple pool volumes by migrating storage areas among multiple pool volumes.

When an I/O is sent from the host computer and the allocation processing program is allocating pages, how often to allocate from which pool volume is defined by the allocation order table (or selection order table) defined for each virtual volume.

Figure 4:
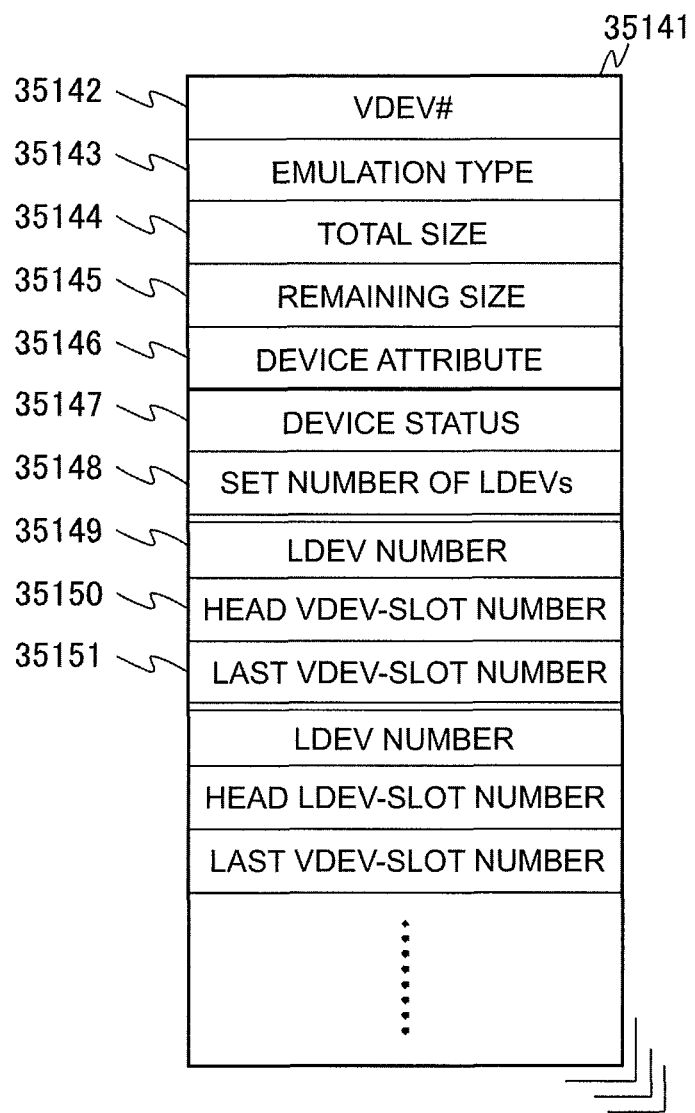
FIG. 4 is a block diagram showing the VDEV management information.

FIG. 4 is a block diagram showing the VDEV management information. The VDEV management information is configured of the VDEV unique information 35141. The VDEV unique information 35141 is configured of the VDEV number (VDEV#) 35142, the emulation type 35143, the total size 35144, the remaining size 35145, the device attribute 35146, the device status 35147, the set number of LDEVs 35148, the LDEV number 35149, the head VDEV-SLOT number 35150, and the last VDEV-SLOT number 35151.

The VDEV# (VDEV number) 35142 is the identifier of the VDEV. The emulation type 35143 is the identifier of the emulation type of the VDEV. The total size 35144 is the total size set for the VDEV. The remaining size 35145 is the size of the unused area in the VDEV.

The device attribute 35146 is the identifier of the attribute defined for the VDEV. If the VDEV is a Type 1 VDEV, the identifier showing the Type 1 VDEV is stored and, if the VDEV is a Type 2 VDEV and set as a virtual volume, the identifier showing the Type 2 VDEV is stored.

The device status 35147 is the identifier showing the VDEV status. The VDEV status includes normal, blockade, failure blockade, and others. Blockade shows the blockade due to a cause other than the occurrence of a failure such as puncture blockade. Failure blockade shows the blockade due to the occurrence of a failure in any one of the devices.

The set number of LDEVs 35148 is the total number of LDEVs set for the VDEVs. The LDEV number 35149 stores the numbers of the LDEVs set in the VDEV. The head VDEV-SLOT number 35150 is the identifier of the physically head slot number of the set LDEV.

The last VDEV-SLOT number 35151 is the physically last slot number of the set LDEV. The above-mentioned LDEV number 35149, the head VDEV-SLOT number 35150, and the last VDEV-SLOT number 35151 are set for each LDEV number; i.e., the same number as that of LDEVs.

Figure 5:
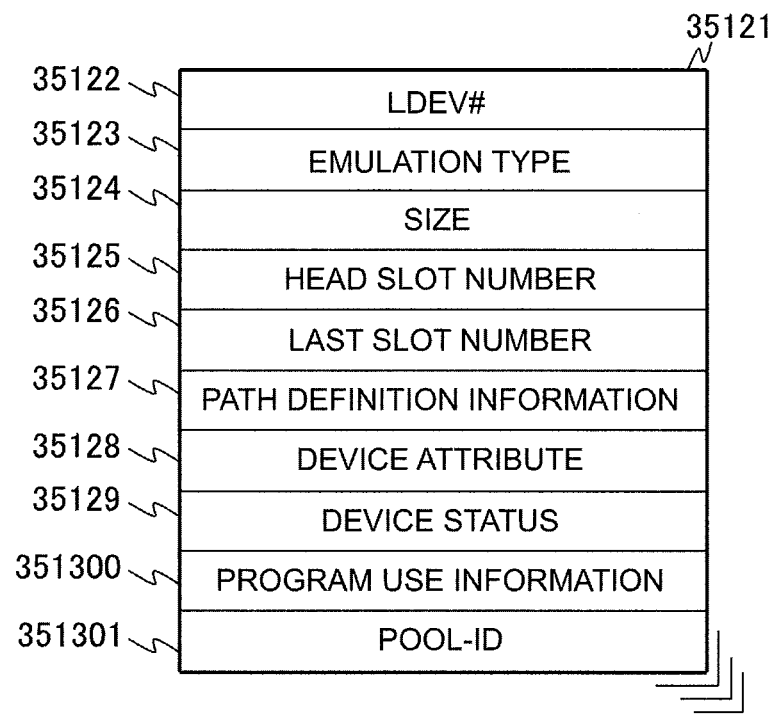
FIG. 5 is a block diagram showing the LDEV management information.

FIG. 5 is a block diagram showing the LDEV management information. The LDEV management information is configured of LDEV unique information 35121. The VDEV unique information 35121 is configured of the LDEV number (LDEV#) 35122, the emulation type 35123, the size 35124, the head slot number 35125, the last slot number 35126, the path definition information 35127, the device attribute 35128, the device status 35129, the program use status 351300, and the POOL-ID 351301.

The LDEV#35122 is the identifier of the LDEV. The emulation type 35123 is the identifier of the emulation type of the LDEV. The size 35124 is the total size set for the LDEV.

The head slot number 35125 is the identifier of the head slot number of the set LDEV. The last slot number 35126 is the last slot number of the set LDEV. The path definition information 35127 is the identifier of the path defined for the host computer 10.

The device attribute 35128 is the identifier of the LDEV attribute. If the LDEV is a Type 1 LDEV, the identifier showing the Type 1 LDEV is stored and, if the LDEV is a Type 2 LDEV, the identifier showing the Type 2 LDEV is stored. Furthermore, if the LDEV is set in the storage pool, the identifier showing the pool attribute is stored.

The device status 35129 is the identifier showing the status of the VDEV to which the LDEV belongs. The status of the VDEV includes normal, blockade, failure blockade, and others. Blockade shows the blockade due to a cause other than the occurrence of a failure such as puncture blockade. Failure blockade shows the blockade due to the occurrence of a failure in any one of the devices.

The program use status 351300 stores, if the LDEV is being used by a program, the identifier of the program. The POOL-ID 351301, if the LDEV is set in the storage pool, stores the identifier.

Figure 6:
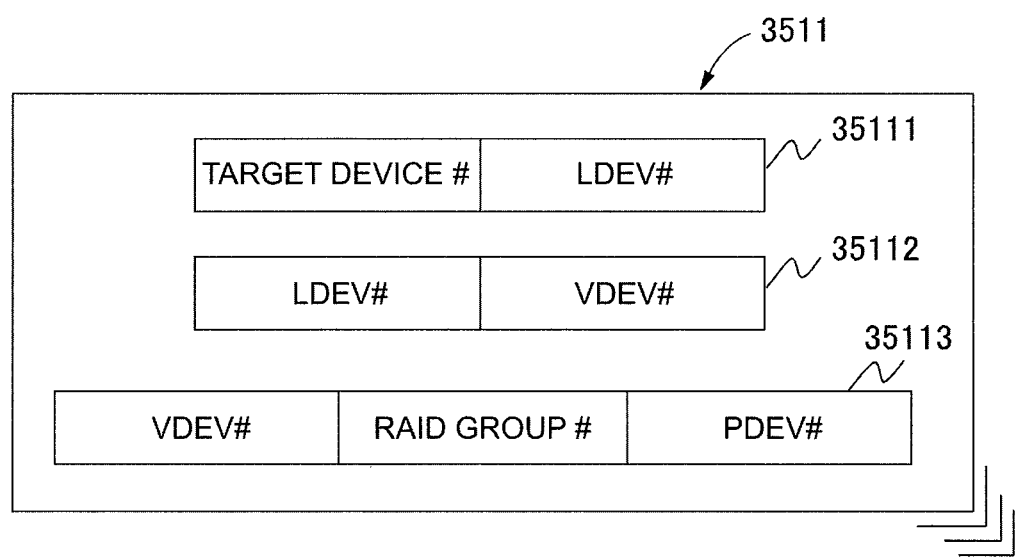
FIG. 6 is a block diagram showing the address management table.

FIG. 6 is a block diagram showing the address management table. The address management table 3511 stores the mapping information of the target device, the LDEV, and the VDEV. The address management table 3511 includes the target device-LDEV mapping information 35111, the LDEV-VDEV mapping information 35112, and the VDEV-PDEV mapping information 35113.

The target device-LDEV mapping information 35111 stores the correspondence of the target device address with the LDEV address. The LDEV-VDEV mapping information 35112 stores the LDEV address and the VDEV address.

The VDEV-PDEV mapping information 35113 stores the VDEV address and the RAID group (or parity group) number for the same, and the PDEV address.

The storage apparatus 30, by referring to this address management table, can ascertain which address of which LDEV the target device address corresponds with. It can also be ascertained which address of which VDEV the LDEV address corresponds with. Furthermore, it can also be ascertained which RAID group the VDEV address belongs to and which address of which PDEV the VDEV address corresponds with.

Figure 7:
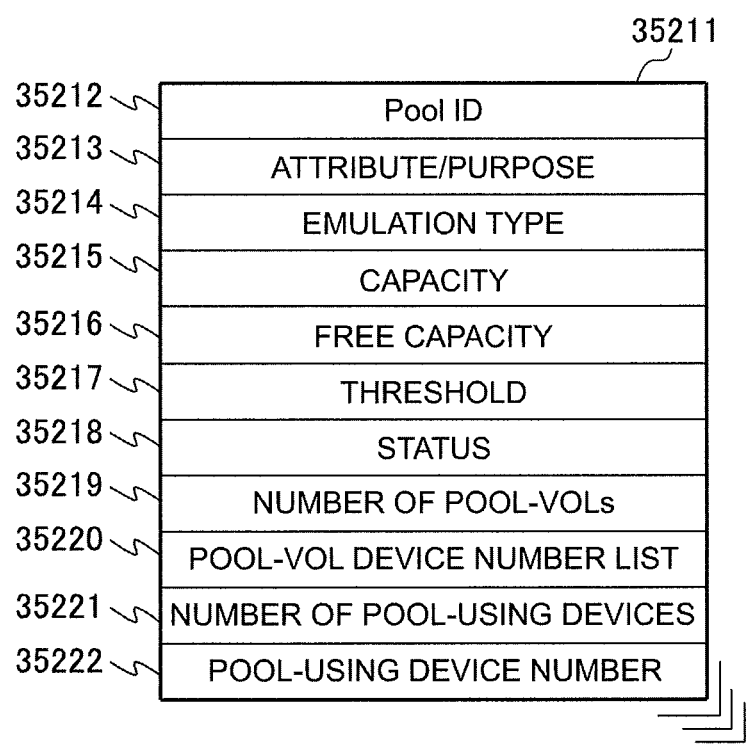
FIG. 7 is a block diagram showing the POOL management information.

FIG. 7 is a block diagram showing the POOL management information. The POOL management information 3521 is configured of POOL unique information 35211. The POOL unique information 35211 is configured of the POOL-ID 35212, the attribute/purpose 35213, the emulation type 35214, the capacity 35215, the unused capacity 35216, the threshold 35217, the status 35218, the number of POOL-VOLs 35219, the POOL-VOL device number list 35220, the number of POOL-using devices 35221, and the POOL-using device numbers 35222.

The POOL-ID 35212 is the identifier of the POOL. The attribute/purpose 35213 is the identifier showing the attribute and the purpose of the storage pool. The purpose is the purpose in the operation form such as snapshots and SYS areas.

The emulation type 35214 is the identifier of the emulation type of the storage pool. The capacity 35215 is the total capacity of the storage pool. The unused capacity is the size of the unused area in the storage pool.

The threshold 35217 is the maximum data storage capacity allowed by the storage pool. The status 35218 is the current status of the storage pool, for example, being defined, being extended, valid, etc. The POOL-VOL number 35219 is the total number of LDEVs set as the storage pool.

The POOL-VOL device number list 35220 is a list of LDEV numbers set as the storage pool. The number of POOL-using devices 35221 is the number of the Type 2 LDEVs with which the LDEVs of the storage pool are associated. The POOL-using device number 35222 is a list of the numbers of the Type 2 LDEVs with which the LDEVs of the storage pool are associated.

Figure 8:
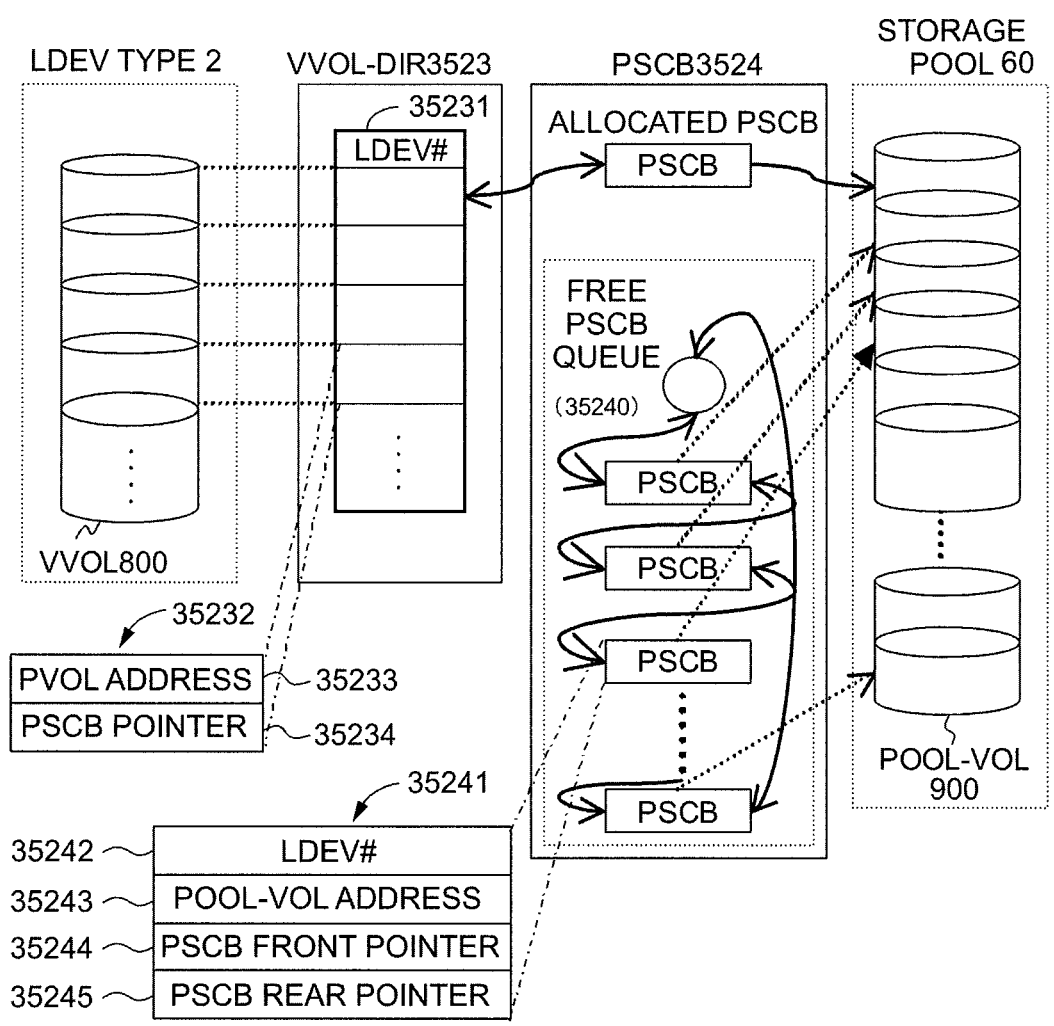
FIG. 8 is a block diagram showing the VVOL-DIR and the PSCB.

FIG. 8 is a block diagram showing the VVOL-DIR 3523 and the PSCB 3524. The VVOL-DIR 3523 is the configuration information of the Type 2 LDEVs which are the storage areas of the virtual volume. The PSCB (POOL Slot Control Block) 3524 is the configuration information of the Type 1 LDEVs as a storage pool.

As mentioned above, the storage apparatus 30 configures a Type 1 VDEV from the PDEVs 34 by the RAID configuration. This Type 1 VDEV is split into Type 1 LDEVs which are storage areas. The Type 1 LDEVs are set as the storage pool. The volume configured of these Type 1 LDEVs set as the storage pool is considered to be a POOL-VOL 900.

Furthermore, the storage apparatus 30 sets a virtual volume (VVOL) and configures a Type 2 VDEV. This type of Type 2 VDEV is split into Type 2 LDEVs which are storage areas.

The storage apparatus 30 allocates the Type 2 LDEVs of the VVOL 800 to the Type 1 LDEVs of the POOL-VOL 900. Consequently, the storage areas of the virtual volumes accessed by the host computer 10 are set for the Type 1 LDEVs configured of the PDEVs 34 which are physical devices.

The VVOL configuration is stored in the VVOL-DIR 3523. The VVOL-DIR 3523 is configured of the LDEV number (LDEV#) 35231 and the entry 35232.

The LDEV number (LDEV#) 35231 is the identifier of the Type 2 LDEV. The entry 35232 is the configuration information of the Type 2 LDEV. This entry 35232 is configured of the Type 2 LDEV address 35233 and the PSCB pointer 35234.

The Type 2 LDEV address 35233 stores the address of the Type 2 LDEV of the VVOL.

The PSCB pointer 35234, if the Type 2 LDEV is allocated to the Type 1 LDEV of the POOL-VOL 900, stores the pointer for the area of the Type 1 LDEV. Note that, as the Type 2 LDEV is not allocated to the Type 1 LDEV in the initial status, the PSCB pointer 35234 stores "NULL."

The PSCB (POOL Slot Control Block Block) 3524 is the information of the Type 1 LDEV set in the storage pool. This PSCB 3524 is set for each slot of the Type 1 LDEVs set in the storage pool.

The PSCB 3524 is configured of the LDEV number (LDEV#) 35242, the POOL-VOL address 35243, the PSCB front pointer 35244 and the PSCB rear pointer 35245.

The LDEV number (LDEV#) 35242 is the identifier of the Type 1 LDEV in the POOL-VOL. The POOL-VOL address 35243 is the address of the Type 1 LDEV in the POOL-VOL 900.

The PSCB front pointer 35244 and the PSCB rear pointer 35245 are the identifiers of the front and rear slots of the Type 1 LDEV in the POOL-VOL 900.

Furthermore, among the areas in the POOL-VOL 900, as for the unused area, its head is shown by the unused (free) PSCB queue 35240. The unused PSCB queue 35240 includes the pointer for the PSCB 3524 showing the next slot.

The storage apparatus 30, referring to the pointer shown by the unused PSCB queue 35240, obtains the next PSCB 3524. Furthermore, referring to the PSCB rear pointer 35245 of the next PSCB 3524, the storage apparatus 30 gradually traces PSCBs 3524, and obtains the PSCB 3524 corresponding with the last slot of the unused area. The PSCB rear pointer 35245 of this last PSCB 3524 is the unused PSCB queue 35240. The storage apparatus 30 traces the unused PSCB queues 35240 and, by the set linked by the pointers of the PSCBs 3524, can ascertain the unused areas of the POOL-VOLs 900 in the storage pool.

The storage apparatus 30 sets the PSCBs 3524 corresponding with the Type 1 LDEVs set as the storage pool. As more specifically described, the PSCB 3524 corresponding with each slot of the Type 1 LDEVs set as the storage pool is set, and the unused PSCB queue 35240 is also set. As the entire storage pool is unused in the initial status, the set linked by the unused PSCB queue 35240 corresponds with all the areas in the Type 1 LDEVs set as the storage pool.

When the storage apparatus 30 uses the areas of this storage pool, by allocating the PSCBs 3524 for the required slots to the VVOL-DIR 3523 which are Type 2 LDEVs, the relevant areas become usable. Multiple sets of slots correspond with pages. Pages are specified from multiple PSCBs. Accesses from the host device to VVOLs 800 and allocation of storage areas from the POOL-VOLs to the access areas of the VVOLs 800 is performed in units of pages.

As more specifically described, the storage apparatus 30 refers to the unused PSCB queue 35240, and then obtains the PSCB 3524 for the required areas (pages) to be allocated to the Type 2 LDEVs. Each of these obtained PSCBs 3524 is allocated to the entry of the VVOL-DIR 3523. That is, the PSCB pointer 35234 of each entry of the VVOL-DIR 3523 stores the pointer showing the corresponding PSCB 3524.

Note that the allocated PSCBs 3524 are excluded from the linkage by the unused PSCB queue 35240.

By this processing, each page (slot) of the Type 2 LDEVs is allocated to the PSCB 3424 shown by the PSCB pointer 35234 of each entry of the VVOL-DIR 3523. As the PSCBs 3524 correspond with the slots of the Type 1 LDEVs, as a result, the Type 2 LDEVs are allocated to the Type 1 LDEVs, and the virtual volumes as the access targets of the host computer 10 become usable as physical devices.

Figure 9:
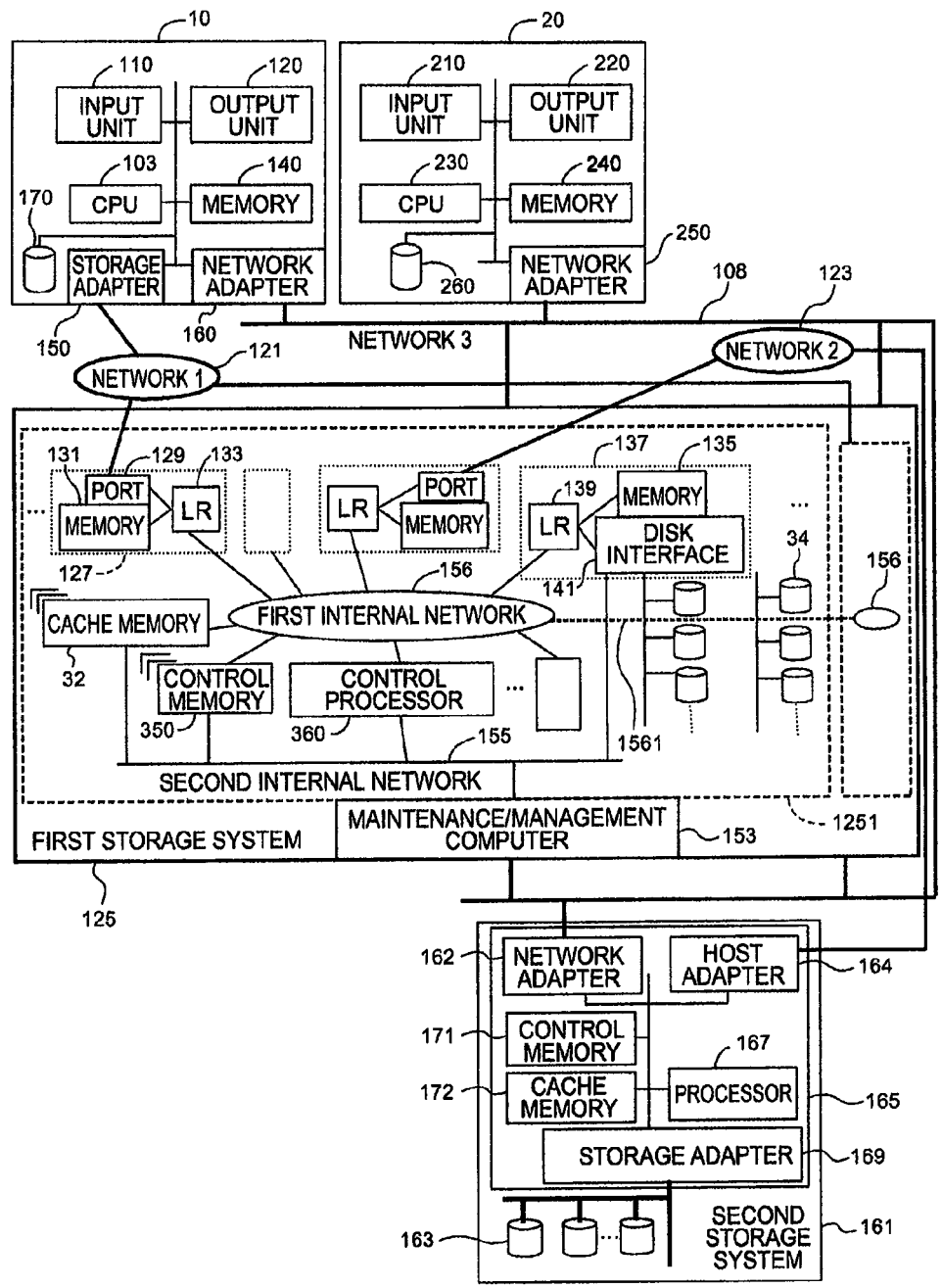
FIG. 9 is a hardware block diagram showing the second embodiment of the computer system.

FIG. 9 is a hardware block diagram showing the second embodiment of the computer system. The computer system of this embodiment also includes one or more host computers 10, a management server 20, a first storage system 125, and a second storage system 161. The first storage system 125 is connected to the host computers 10 via a first network 121.

The second storage system 161 is connected to the first storage system 125 via a second network 123. The one or more host computers 10, the management server 20, the first storage system 125 and the second storage system 161 are connected to each other via a third network 108.

The first network 121, the second network 123, and the third network 108 may be any type of network. For example, the first network 121 and the second network 123 may be what is called SAN. The third network 108 may be what is called LAN.

The first storage system 125 includes a controller and a group of storage systems 34. The controller includes, for example, multiple front-end interfaces 127, multiple back-end interfaces 137, a first internal network 156, one or more cache memories 32, one or more control memories 350, and one or more control processors 360.

The front-end interfaces 127 are interface circuits for the communication with the host computers 10 or the second storage system 161 connected to the storage system 125 via the network.

Therefore, the storage system 125 includes at least two front-end interfaces 127, and one of them is connected to the first network 121, and the other is connected to the second network 123.

A front-end interface 127 includes, for example, a port 129 connected to the first network 121 or the second network 123, a memory 131, and a local router (hereinafter referred to as an 'LR') 133. To the LR 133, the port 129 and the memory 131 are connected.

The LR 133 distributes the data received via the port 129 for the processing in an arbitrary control processor 360. As more specifically described, for example, the control processor 360 sets the LR 133 to cause the control processor 360 perform the I/O command for specifying a certain address. In accordance with the settings, the LR 133 distributes I/O commands and data.

Back-end interfaces 137 are interface circuits for the communication with PDEVs 34. A back-end interface 137 includes, for example, a disk interface 141 to be connected to the PDEVs 34, a memory 135, and an LR 139. To the LR 139, the disk interface 141 and the memory 135 are connected.

The first internal network 156 is configured, for example, of a switch (e.g., crossbar switch) or a bus. To the first internal network 156, multiple front-end interfaces 127, multiple back-end interfaces 137, one or more cache memories 32, one or more control memories 350, and one or more control processors 360 are connected. The communication among these components is performed via the first internal network 156.

To the front-end interfaces 127, the back-end interfaces 137, the cache memories 32, the control memories 350, and the control processors 360, which are the components of the controller, the second internal network (e.g., LAN) 155 is connected, and a service terminal 153 is connected to the second internal network 155.

The service terminal 153 is also connected to the third network 108 and is the computer for maintaining or managing the storage system 125. The maintenance personnel of the storage system 125, for example, by operating the service terminal 153 (or the management server 20 communicable with the service terminal 153), can define various types of information stored in the control memory or memories 350.

The second storage system 161 includes a controller 165 and PDEVs 163. The controller 165 includes, for example, a network adapter 162, a host adapter 164, a cache memory 172, a control memory 171, a processor 167, and a storage adapter 169.

The network adapter 162 is connected to the third network 108 and is the interface for the communication with the management server 20.

The host adapter 164 is connected to the second network 123 and is the interface for the communication with the first storage system 125. The host adapter 164, for example, may be the same as the front-end interface 127 of the first storage system 125.

The control memory 171 is the memory for storing various types of computer programs and information. The cache memory 172 is the memory for temporarily storing the data read or written in accordance with I/O commands from the first storage system 125.

The processor 167 performs various types of computer programs stored in the control memory 171. At least, the processor 167, in accordance with the I/O commands from the first storage system 125, controls write and read of data for the cache memory 172 and the PDEVs 163.

The PDEVs 163 are physical storage systems and, for example, may be the same as the PDEVs 34 in the first storage system or the PDEVs may be tape storage media.

The first storage system 125 of this embodiment includes what is called external connection functions. The second storage system 161 is connected to the first storage system 125 by this function. External connection is described below.

As mentioned above, the first storage system 125 provides one or multiple logical volumes to the host computer or computers 10. Each logical volume is recognized as a storage system by the host computer or computers 10. For example, the correspondence of the logical volumes provided by the first storage system 125 with the PDEVs 34 in the first storage system 125 may be made. In that case, the first storage system 125, when receiving a write command to a logical volume, stores the data in the PDEV 34 with which the correspondence of the logical volume is made. This type of logical volume is also referred to as a normal volume in the description below.

In other cases, the correspondence of a logical volume provided by the storage system 125 with the PDEV 163 in the second storage system 161 may be made. In this case, the first storage system 125, when receiving a write command to the logical volume, creates a write command for writing data in the PDEV 163 with which the correspondence of the logical volume is made, and sends the created write command to the second storage system 161. The second storage system 161, in accordance with the write command received from the first storage system 125, stores the data in the PDEV 163. This type of logical volume is also referred to as a virtual volume in the description below.

As mentioned above, the function of storing the data stored in the logical volume provided by the first storage system 125 actually in the second storage system 161 connected outside the first storage system 125 is called the external connection function.

The first storage system 125 includes multiple clusters 1251 for establishing the storage control processing. Each cluster includes an internal network 156, and multiple cluster internal networks 156 are connected by the network 1561 among the clusters.

Therefore, the control processor or processors 360 of a cluster can access other clusters, for example, read/write the data in the cache memory 32 of the other clusters. The network 1561 among the multiple clusters is configured of a path or a switch.

Figure 10A:
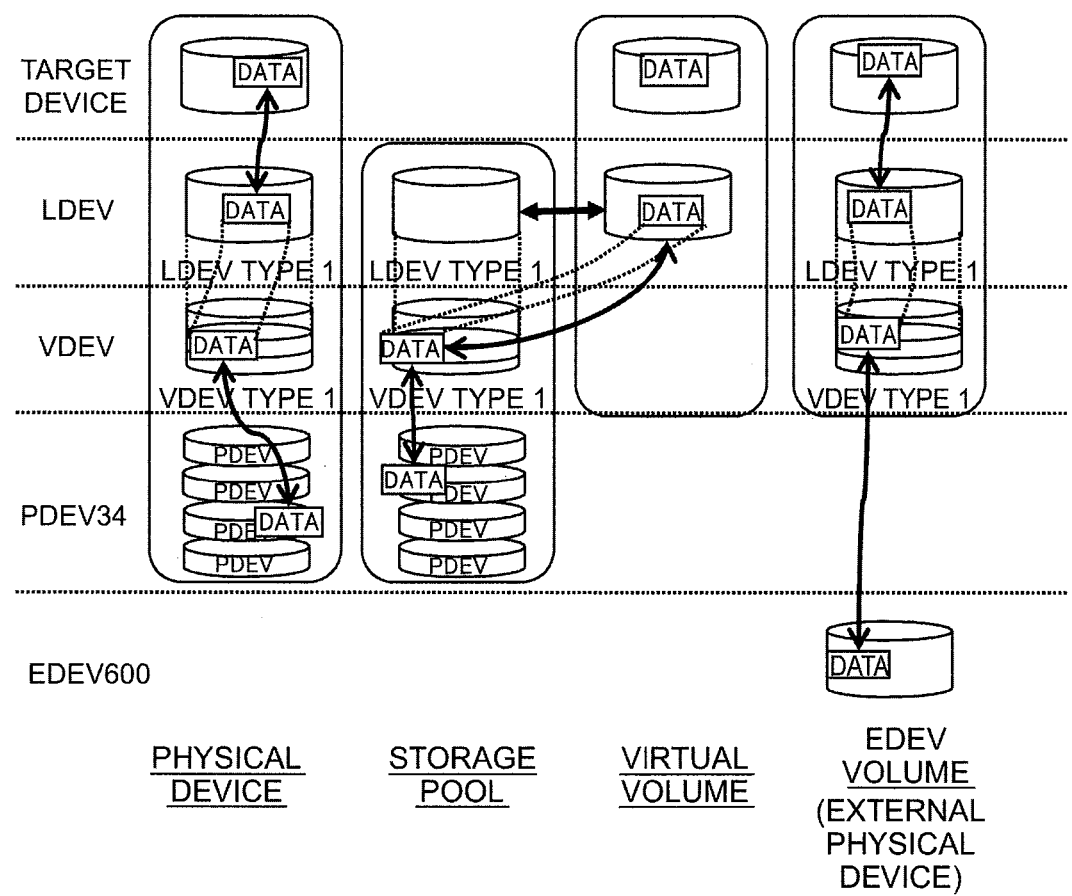
FIG. 10A is a block diagram showing the mapping relationship among target devices, LDEVs and PDEVs in the system shown in FIG. 1.

FIG. 10A is a block diagram showing the relationship among target devices, LDEVs and PDEVs in the system shown in FIG. 1. The host computer 10 accesses the target device 700 set in the storage system 30. The storage area of the target device 700 is a Type 1 LDEV 500.

The Type 1 LDEV 500 is the area of the Type 1 VDEV 400 configured by the RAID configuration from the physical volume. The Type 1 VDEV 400 is split into one or more Type 1 LDEVs 500.

Furthermore, the host computer 10 accesses the virtual volume set in the storage apparatus 30 as a target device 701. The virtual storage area of this target device 701 is a Type 2 LDEV 501. The Type 2 LDEV 501 is associated with the Type 1 LDEV 500 set as a storage pool. Specifically, the association of Type 1 LDEVs with Type 2 LDEVs is managed by address mapping.

The host computer 10 accesses the target device 701 which is a virtual volume. The storage area of this virtual volume is a Type 2 LDEV 501. The storage apparatus 30, when receiving an access to the Type 2 LDEV 501, converts the Type 1 LDEV 500 associated with the Type 2 LDEV 501 into the access destination. The write data from the host computer is directly stored in the VDEV of the pool volume.

Figure 10B:
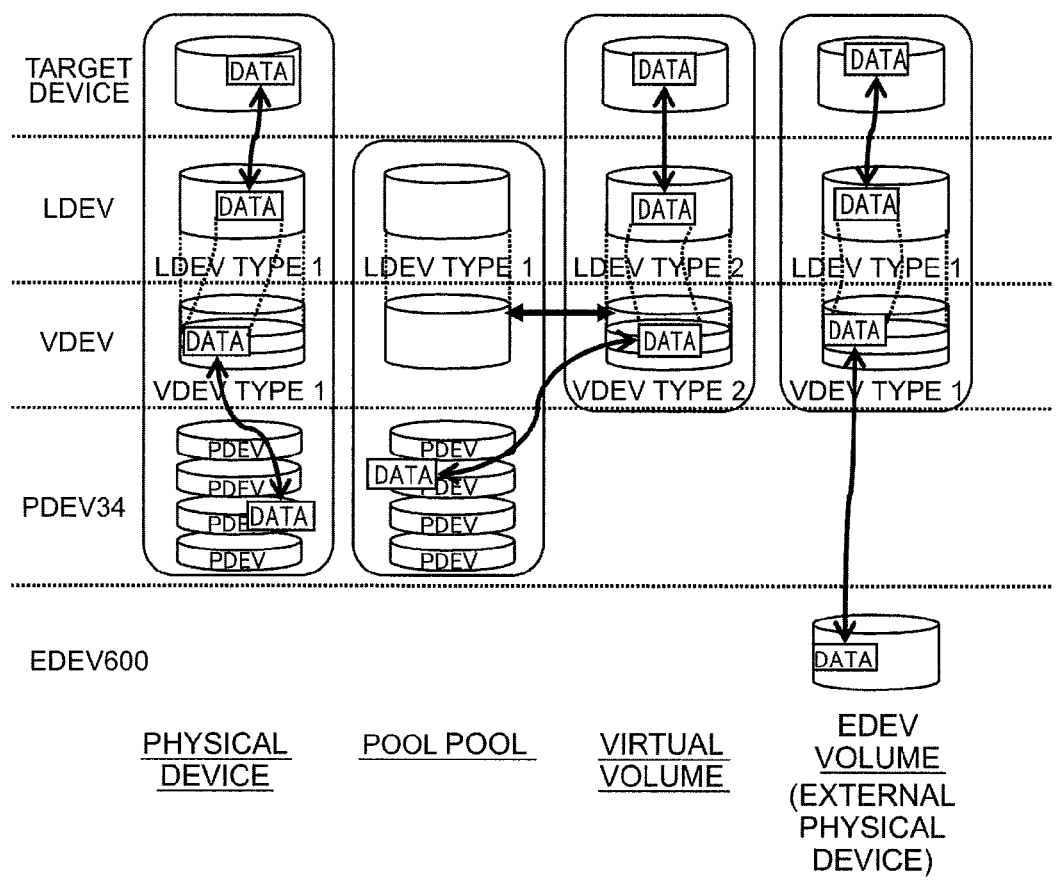
FIG. 10B is the same type of block diagram showing the system shown in FIG. 9.

FIG. 10B is a block diagram of the second computer system shown in FIG. 9, corresponding with FIG. 10A. The Type 1 VDEV and the Type 2 VDEV are associated by mapping the addresses, and the write data from the host computer is directly stored in the PDEVs.

Figure 11:
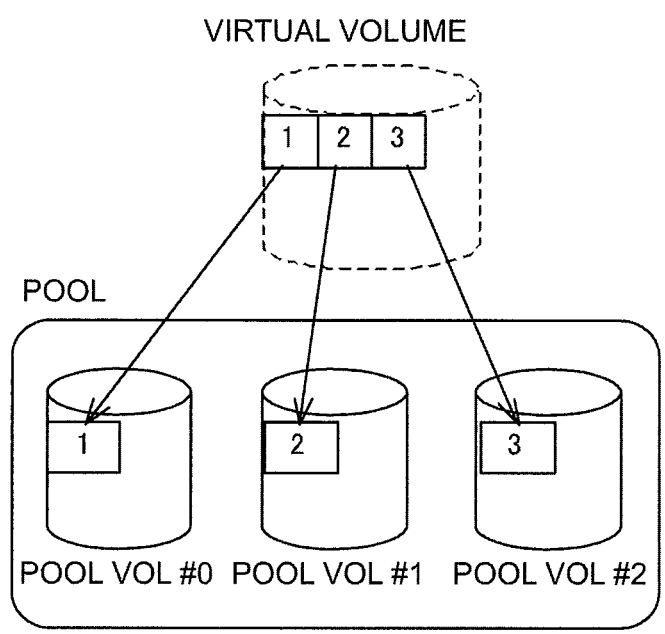
FIG. 11 is a block diagram showing the process in which pages are equally allocated among a virtual volume and multiple pool volumes.

FIG. 11 shows the process in which the pages (1, 2, 3) as the access target and the units of storage areas are equally allocated among a virtual volume (Type 2 LDEVs) and multiple pool volumes (Type 1 LDEVs). The pool is allocated to the virtual volume, and the pool includes multiple volumes. The pages of the virtual volume correspond with the pages of multiple volumes.

When the virtual volume is accessed by the host computer, the pages of the pool volume are allocated to the pages of the virtual volume.

In FIG. 11, if the virtual volume is accessed by the host computer in the order of (1), (2), and (3), the equal allocation processing program 3508 (FIG. 3) performs the processing for sequentially allocating page (1) to pool volume #0, page (2) to pool volume #1, and page (3) to pool volume #2.

In the status of FIG. 11, if volume #3 is added to the pool and the page allocation is not equally performed among the pool volumes, for the write in the unallocated areas in the virtual volume, the allocation from pool volume #3 including more unused areas to the virtual volume increases. Naturally, as the RAID group including many unused areas is intensively accessed, the performance of the storage system for processing accesses from the host computers is deteriorated.

Figure 12:
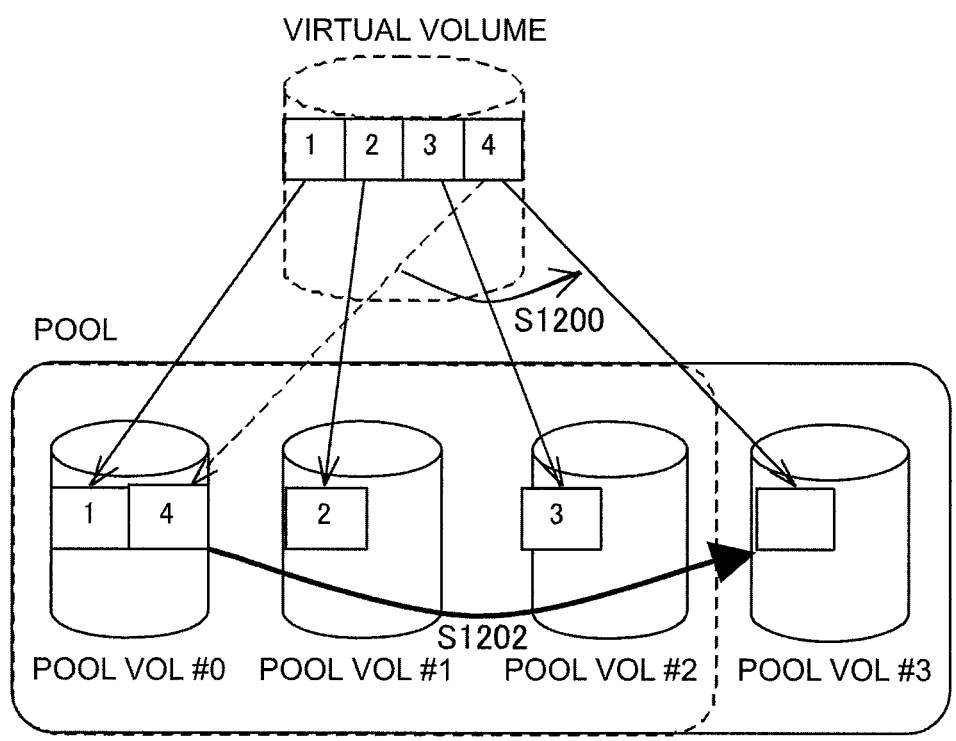
FIG. 12 is a block diagram of a virtual volume and pool volumes showing the process of rebalancing pages among the multiple pool volumes.

Therefore, the rebalance processing program 3509 (FIG. 3), considering that, if volumes are added to the pool, the added pool volumes and the existing pool volumes become imbalanced, has determined to migrate the pages from the existing pool volumes to the added pool volumes before using the added pool volumes, for the purpose of equalizing the storage capacity among each pool volume. Migrating pages among multiple pool volumes is hereinafter referred to as page relocation or page rebalance. FIG. 12 is a block diagram showing the rebalance process.

Note that, if the pool management program manages the pool information and pool volumes are added, the pool management program detects this addition, and that trigger starts the rebalance processing program.

Firstly, the rebalance processing program 3509 saves the unused pages in the pool volume #3 added to the pool.

Subsequently, the data of the page (4) of the pool volume #0 whose number of allocated pages is larger than that of the other pool volumes #1 and #2 is copied to the unused pages in the pool volume #3 (S1202).

The rebalance processing program releases the allocation of the page (4) allocated to the pool volume #0 and connects it to the unused queue, and further changes the area allocation of the page (4) in the virtual volume from the page in the pool volume #0 to page (4) in the pool volume #3 (S1200). Data copy among pages is called migration. This process is page migration and page relocation.

As a result of the above-mentioned processing, the pages allocation to all of the multiple pool volumes is equalized, which equalizes the I/O rate for each of the multiple pool volumes and keeps the high performance of the storage system for processing accesses from the host even after pool volumes are added.

In FIG. 12, assuming that the capacity of each of the multiple pool volumes is the same, the number of allocated pages is kept the same among the multiple pool volumes.

For equalizing the number of allocated pages among the multiple pool volumes, it is important to consider the capacity of the pool volumes and equalize the rate of pages used for the allocation (page usage rate) of all the pages (all the pages that can be allocated in the pool volumes) among the multiple pool volumes. The same consideration is important if the storage capacity instead of the number of pages is calculated.

Figure 13:
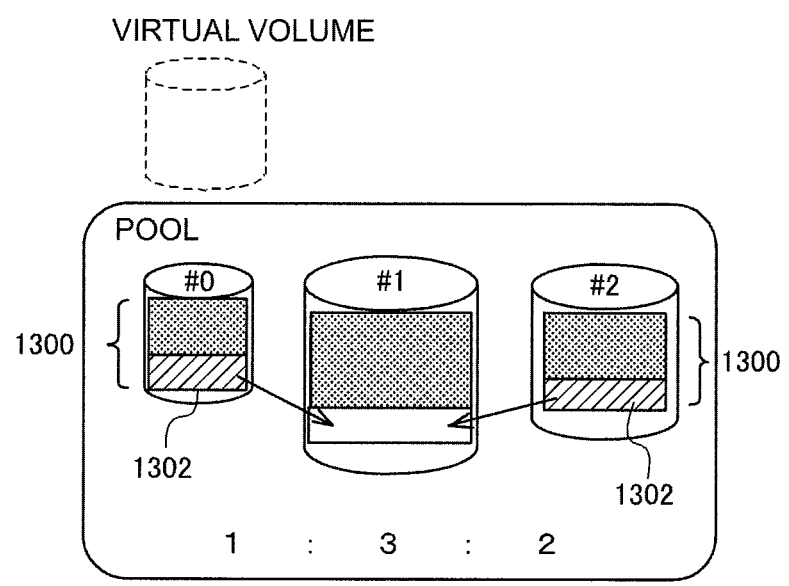
FIG. 13 is a block diagram of a virtual volume and pool volumes showing the process of considering the capacity ratio of pool volumes and performing the rebalance among the multiple pool volumes.

FIG. 13 is a block diagram showing the above-mentioned consideration. The reference sign 1300 is the total capacity of the pages allocated to each volume, and 1302 is the capacity of the pages to be migrated among the volumes. For the capacity ratio of the pool volumes, the pool volume relation #0:#1:#2 is 1:3:2. Therefore, for equalizing the page usage rate, pages are relocated to the pool volume #2 from the pool volumes #1 and #3 respectively.

FIG. 16A is a table for managing a pool, and FIG. 16B is a table for managing a pool volume. These tables are stored in the memory 350 as part of the pool information 352 (FIG. 3). These tables are created from the management information. The rebalance processing program 3509 of the storage system refers to these tables and establishes the rebalance processing system described in FIGS. 12 and 13.

FIG. 16C is a table for managing an unused queue unit. The allocation of unused pages (pool volumes) to the access areas in the virtual volume is, as mentioned above, managed by unused queues. The unused queues are set in units of pool volumes.

To the unused queue, the multiple unused pages of the pool volumes are connected by the FIFO structure. When unused pages are allocated to the virtual volume, the unused pages are sequentially released from the unused queue, and processed as the destination of mapping from the virtual volume and of data copy.

This table is configured of the unused queue identification number (#), the pool volume # as the target of the management for unused areas by the unused queue, the number of unused areas linked to the unused queue, and the pool # to which the unused queue belongs. This table is also recorded in the memory 350 as a part of the pool information.

Figure 17:
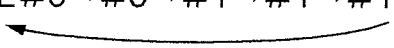
FIG. 17 is a block diagram showing the order of allocating pages from pool volumes belonging to the pool to the virtual volume in response to a write access from the host computer to the virtual volume.

FIG. 17 is a block diagram showing the order of allocating pages from pool volumes belonging to the pool to the virtual volume in response to a write access from the host computer to the virtual volume. The description here assumed the pool including multiple pool volumes whose storage capacity ratio is 2:3:2.

For allocating pages of the virtual volume to the pool volumes equally, it is necessary to specify the order of page allocation for the volumes including the volumes added to the pool volumes. This allocation order is registered in the memory as the management information (refer to FIG. 18).

The equal allocation processing program 3508 refers to this management information, calculates the address of the targeted unused queue from the multiple unused queues, obtains the addresses of the unused pages connected to the unused queues (pointer information: PSCB), and stores the write data sent to the pages of the virtual address from the host device in those addresses.

In order to realize the above, the unused queue address and the pool volume identification information correspond with each other by 1:1. For example, the unused queue #0 manages the unused area of the pool volume #0, the unused queue #1 manages the unused area of the pool volume #1, and the unused queue #2 manages the unused area of the pool volume #2.

FIG. 17 shows that the pages are allocated to the pool volume #0 twice in a row, then to the pool volume #1 three times in a row, and further to the pool volume #2 twice in a row, and this cycle is repeated afterwards.

FIG. 18 is a table for managing this allocation order and registers the allocating method shown in FIG. 17. This table is also recorded in the memory as the pool information. The allocation processing program 3508 refers to this management table and manages the order control processing of the page allocation for the pool volumes.

This program includes a software counter and manages to which pool volumes pages have been allocated so far. As the counter is incremented each time a page is allocated, the pool volume as the target of the current page allocation can be ascertained by the position of the counter. FIG. 18 shows that the counter is at the pool volume #1 (unused queue #1).

Figure 14:
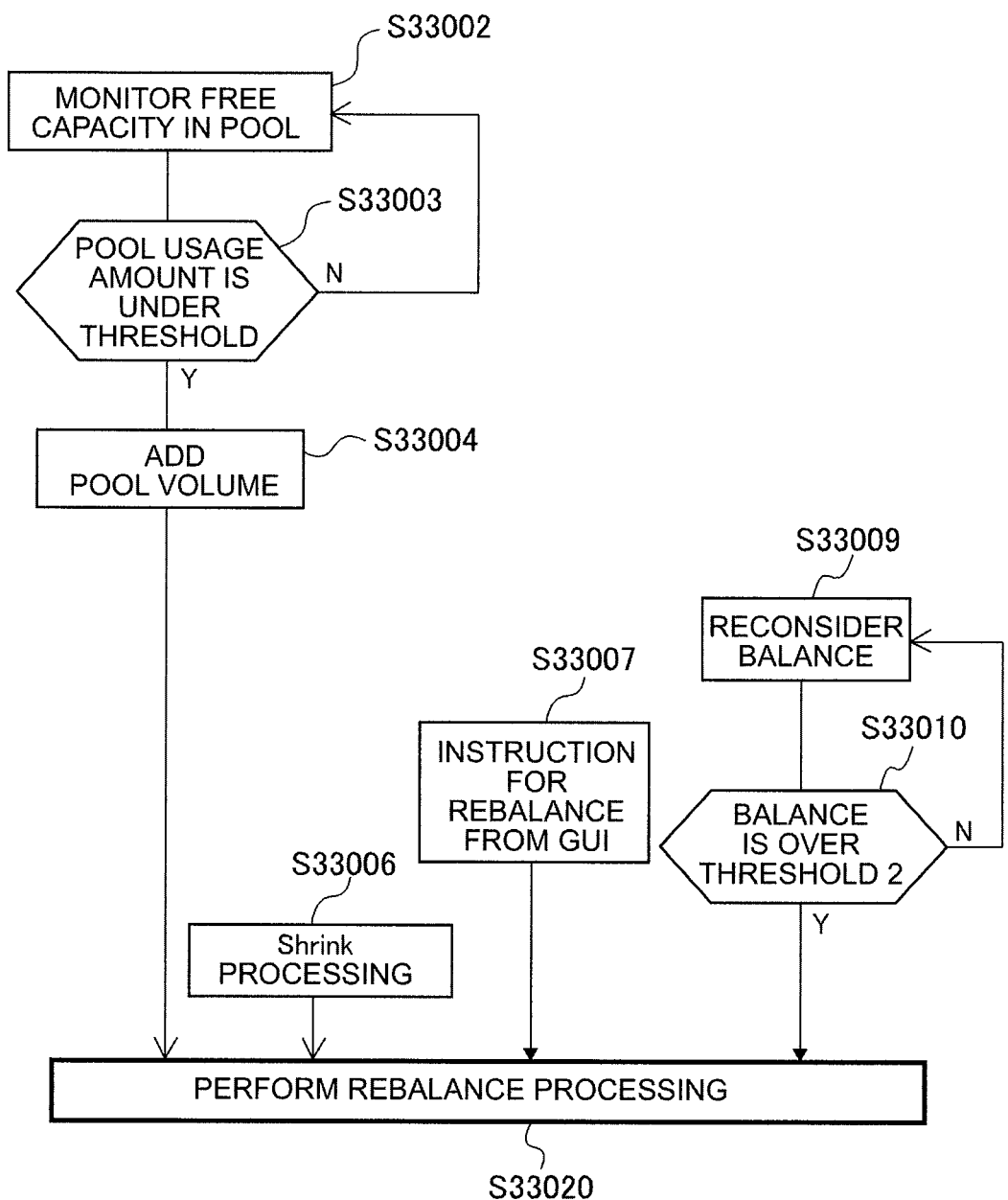
FIG. 14 is a flowchart showing that the storage system performs the rebalance in accordance with the trigger for the rebalance.

The events to be the triggers for the storage system to perform page relocation (FIG. 12, FIG. 13) include the addition of pool volumes to the pool as shown in FIGS. 12 and 13 as well as, as shown in FIG. 14, the deletion (shrink) of pool volumes from the pool, the balance of the pages used among multiple pages to the total number of pages, the balance of the usage amount to the pool volume capacity, or the request from the user via a GUI.

In FIG. 14, the rebalance processing program 3509 monitors the unused capacity of the pool for a certain period of time (S33001, S33002), and determines whether the total usage amount of the pool (the capacity of all the pages used for allocation) has exceeded a threshold or not (S33003).

If the usage amount exceeds the threshold, the management apparatus 20 or the maintenance computer performs the processing for newly adding pool volumes to the pool. The storage apparatus updates the management information shown in FIGS. 5 to 7 in accordance with the addition of pool volumes (S33004). Subsequently, the processing shifts to the rebalance (S33020). The rebalance processing is described later with reference to FIG. 15.

Meanwhile, the deletion of pool volumes also becomes the trigger for the rebalance processing. If a rebalance command comes from the administrative user via the GUI, the storage system performs the rebalance processing. The GUI is included in the management server 20 or in the service terminal.

Furthermore, the monitoring function of the rebalance program, in a specified interval, checks the balance of the pages used among multiple pages to the total number of pages in each pool volume in the pool (S33009), and compares it with a threshold (S3310). If the number is larger than the threshold, the balance is considered to be disrupted, and the storage system performs the rebalance processing.

Figure 15:
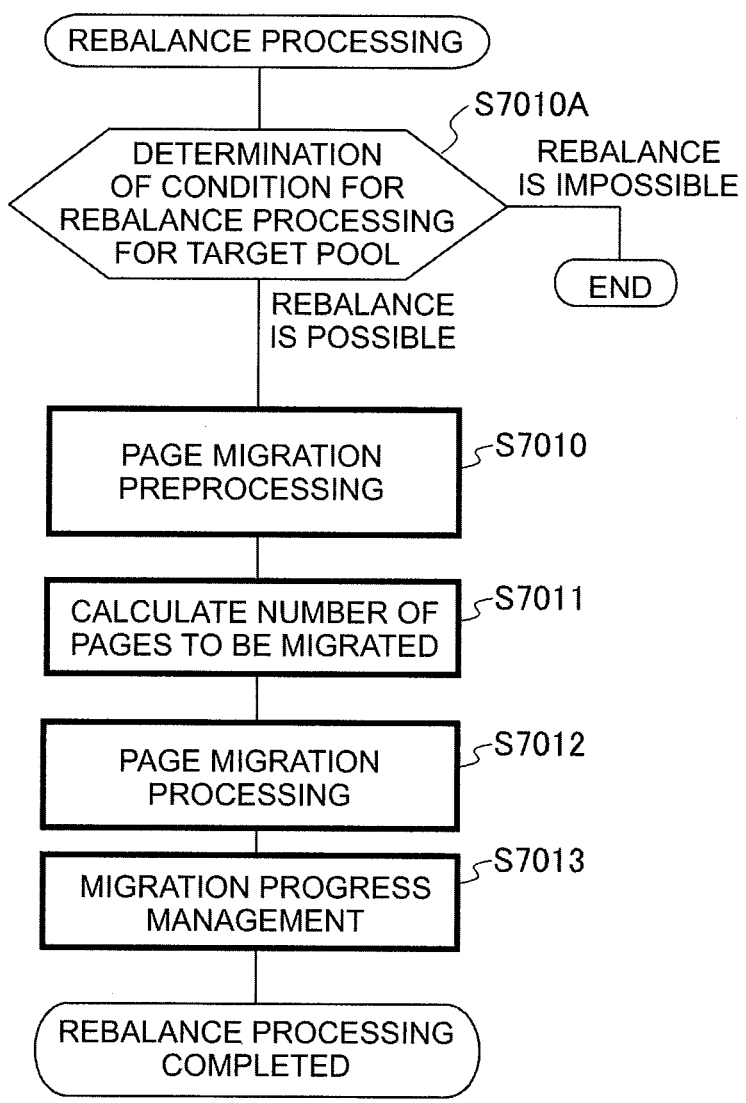
FIG. 15 is a flowchart showing the rebalance processing.

FIG. 15 is a flowchart showing the rebalance processing. The rebalance processing program determines the possibility of rebalancing the pool which is the target of the rebalance (S7010A). This determination is performed by examining, for example, the pool information 352 in FIG. 3. If the pool status (35218 in FIG. 7) is "blocked," the rebalance is determined to be impossible.

If the rebalance is determined to be possible, the rebalance processing program performs the preprocessing (S7010), for example, determines the pool volumes as the source and as the destination of page migration (changing the page allocation or migration), determines the order of selecting (order of allocating) the pool volumes for which the page migration processing is performed, and simulates the capacity of the pool volumes after the page migration, etc.

When pool volumes are added to the pool, the pool is managed by the pool management information, and the storage system reconsiders the capacity ratio of the pool volumes.

Next, the rebalance processing program calculates the number of pages to be migrated in the pool (S7011), and then performs the page migration processing (S7012). At this point of migration, as described later, the fixed pattern existing in the multiple pool volumes (e.g., the page whose data is all "0") is discarded, and the processing for reducing the pool volume capacity is performed at the same time.

In page migration, the rebalance processing program determines whether there are any conditions for suspending the rebalance processing or not. For example, if there is any I/O to the page as a rebalance target from the host computer, the rebalance is suspended. The rebalance processing may be resumed after the cause of suspending the rebalance is removed.

Next, the rebalance processing program manages the progress of the page migration (S7013). By this management, the rebalance processing program can disclose the progress of the rebalance to the user.

Figure 19:
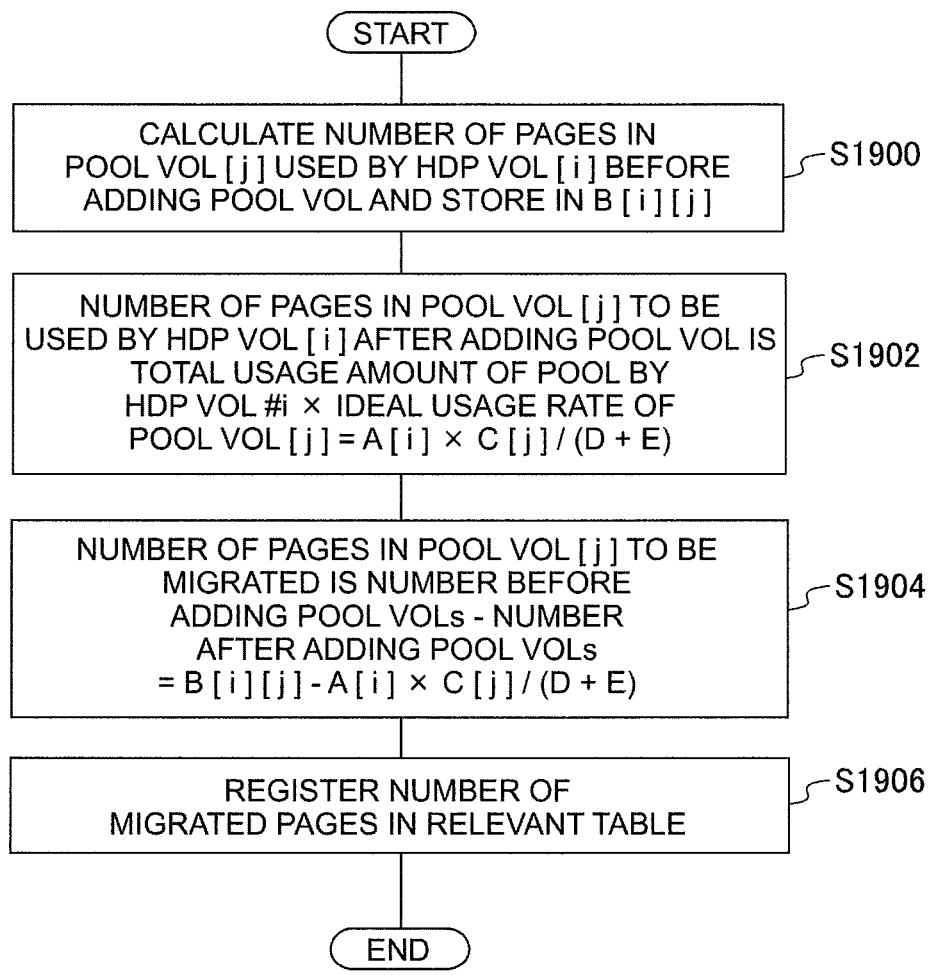
FIG. 19 is a flowchart showing the processing of calculating the number of pages migrated among multiple pool volumes.

FIG. 19 is a flowchart showing the details of calculating the number of pages to be migrated in FIG. 15 (S7011). The method of calculating the number of pages at this point is specifying the number of pages balanced among the multiple pool volumes as the ideal number of pages and making up the difference between this number and the number of the currently used pages.

The rebalance processing program searches the usage amount of pages in each pool volume which is allocated to an HDP VOL virtual volume.

The description of FIG. 19 assumes the following items:
The total usage amount of the pool by the HDP VOL #i (the total number of pages allocated to (used by) all the volumes belonging to the pool): $A[i]$
The total usage amount of the pool volume #j by the HDP VOL #i: $B[i][j]$
The capacity of the pool volume #j (total number of pages): $C[j]$
The capacity of the entire pool (total number of pages): $D$
The capacity of all the added pool volumes (total number of pages): $E$.

Firstly, the rebalance processing program calculates the number of pages by the pool volume [j] allocated to the HDP VOL [i] before adding pool volumes, and stores it in $B[i][j]$ (S1900). $B[i][j]$ is set as the work area of the memory 350.

Next, the rebalance processing program calculates the number of pages in the pool volume [j] to be used by the HDP VOL [i] after adding pool volumes to the pool by the method described below (S1902).

$$\text{Total usage amount of pool by HDP VOL } \#i \times \text{Ideal usage rate of pool volume } [j] = A[i] \times C[j]/(D+E)$$

The ideal usage rate of the pool volume is the ratio of the pages allocated to the pool volumes to the total number of pages that can be stored in the pool volume, and is the value assuming that the pages are equally allocated among multiple pool volumes.

The number of pages involving migration for the pool volume [j] is the difference between before and after adding pool volumes as described below (S1904).

$$\text{Number of pages} = B[i][j] - A[i] \times C[j]/(D+E)$$

If the above-mentioned calculated value is a positive value (+), the pool volume [j] is a migration source volume and, if the calculated value is a negative value (−), the pool volume [j] is a migration destination volume.

After calculating the number of migrated pages, the rebalance processing program, for each pool number, registers the number of migrated pages and whether the pool volume is the migration source or the migration destination in the exclusive table (S1906).

Figure 20:
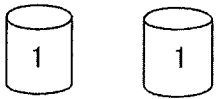
FIG. 20 is a block diagram of a virtual volume and pool volumes showing the calculated number of pages and the process of page migration.

FIG. 20 is a block diagram showing the number of pages calculated by the processing of FIG. 19 and the process of page migration. The page migration is based on the result of calculating page migration of each virtual volume, in the multiple pool volumes belonging to a storage pool group and in the multiple virtual volumes corresponding with them. The numeric values in the symbols of pool volumes show the numbers of pages to be used for allocation in the pool volumes.

As shown in FIG. 20, as for the virtual volume #0, no page migration is performed among multiple pool volumes. As for the virtual volumes #1 and #2, in the direction of the arrows shown in FIG. 20, the pages of the number shown above the arrows are migrated.

The rebalance processing program performs page migration in units of pools. That is, all the page migration shown in FIG. 20 is performed. Note that page migration in units of virtual volumes may also be permitted. For example, it is possible to perform page migration among multiple pool volumes for the virtual volume #1 and not to perform page migration for the virtual volume #2.

FIG. 21 is a management table for achieving the page migration mode shown in FIG. 20. This management table is stored in the specified area of the memory 350. The management table exists in each virtual volume and is created with reference to the processing of step S1906 in FIG. 19.

Whether each pool volume is the migration source or the migration destination is registered for each virtual volume, and the number of pages migrated from the pool volume as the migration source to the pool volume as the migration destination is registered in the pool volumes as the migration source and the migration destination respectively.

The rebalance processing program creates and registers this table by the processing of S7011 (FIG. 15), refers to this table at S7012, and performs migration.

FIG. 22 is a page allocation balance management table for achieving the reconsideration of the balance (S33009 in FIG. 14). In the process of page allocation to the pool volumes by the equal allocation processing program 3508, the rebalance processing program 3509 registers the required items in this table. This table is stored in the specified area of the memory. This management table exists in each virtual volume.

In this table, the ideal number of allocated pages is the number of allocated pages which is ideal for the number of currently allocated pages for the pool volumes, and is determined with reference to the capacity ratio of the multiple pool volumes. The pool volumes #0:#1:#2:#3 (capacity ratio) is 2:3:2:2. As the total number of pages allocated to the virtual volume is 18, considering the capacity ratio, the ideal number of allocated pages is 4:6:4:4.

Meanwhile, the allocation balance is the ratio of the number of actually allocated pages to the ideal number of allocated pages. The pool volume whose allocation balance exceeds 1 shows that the pages are excessively allocated, and, on the other hand, the pool volume with the allocation balance less than 1 shows that the excessively few number of pages are allocated.

The equal allocation processing program or the service terminal refers to the allocated page management table periodically and determines the quality of the allocation balance. For example, if the range from 1.0 to ±0.35 shows that the allocation balance is favorable, it can be considered that the pool volume #0 is off balance and that the remaining pool volumes are well balanced.

If the number of pool volumes whose balance is determined to be off-balance exceeds **% (threshold: S33010 in FIG. 14) of all the pool volumes, the entire pool is determined to be off-balance, and the rebalance processing program starts the migration processing for the pages. The allocated page management table may be checked by the management program of the service terminal in the storage system.

Meanwhile, the quality of the allocation balance may be determined for each pool volume. For example, if there is at least one pool volume whose allocation ratio is out of the range from 1.0 to ±0.85, the storage system determines that the entire pool is off-balance and starts the rebalance.

Figure 23:
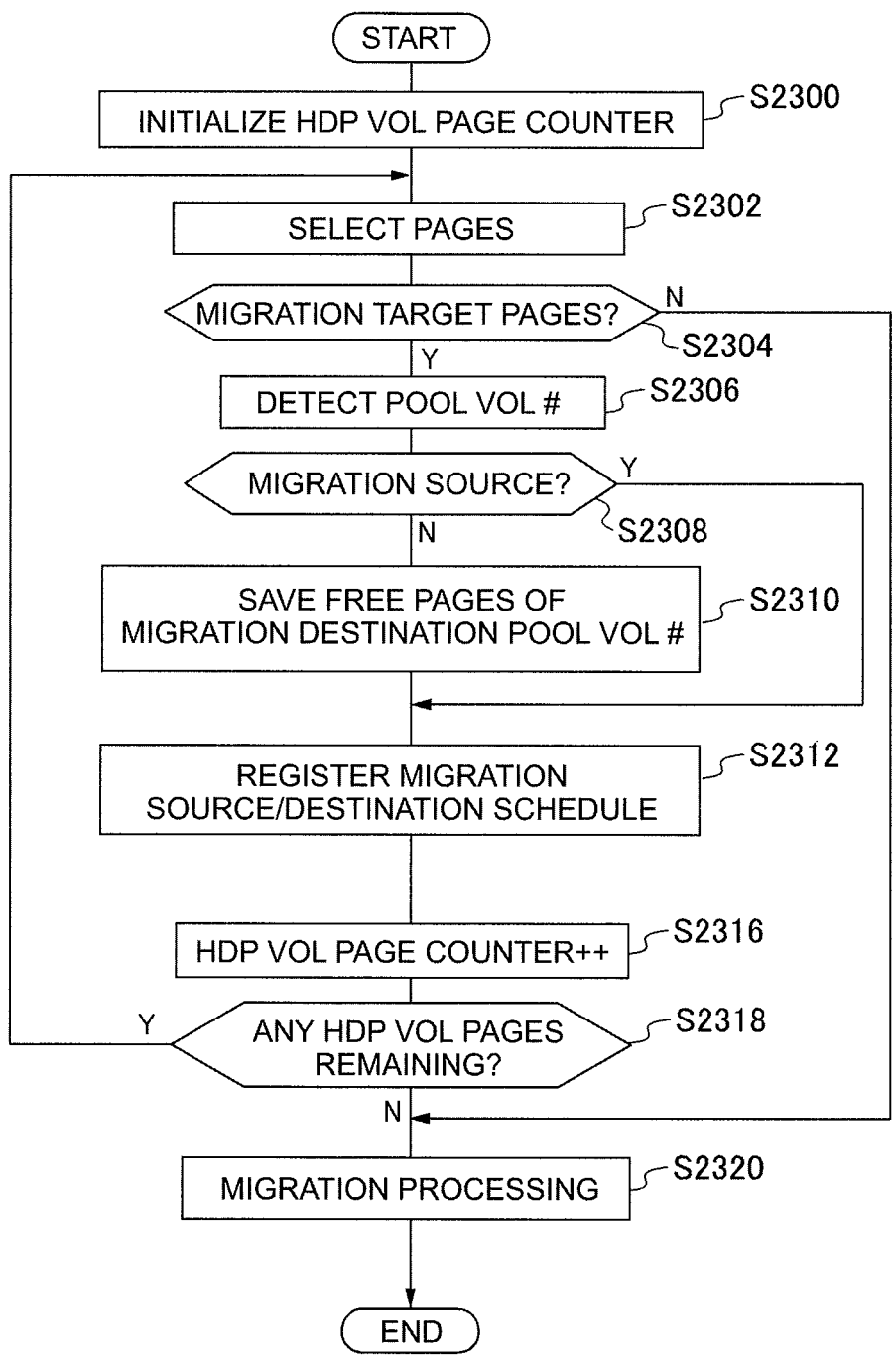
FIG. 23 is a flowchart showing the details of the migration processing.

FIG. 23 is a flowchart showing the details of the migration processing in FIG. 15 (S7012). This processing is, if there are multiple virtual volumes, performed for each of the virtual volumes.

The rebalance processing program detects the related pages from the virtual volume. Though the migration target is the pages of the pool volume, by referring to the address management table 3511, the related pages corresponding with the pages as the migration target can be identified from all the pages in the virtual volume.

The rebalance processing program determines whether each of all the pages from the head page in the virtual volume is a related page or not. The software counter is used for managing to which pages the check has been done so far. As the page check progresses, the counter is incremented. Therefore, the rebalance processing program performs the counter initialization (S2300).

Next, the rebalance processing program selects the pages in the virtual volumes from the head pages (S2302). Next, whether the pages as the migration target of the pool volume are allocated to the selected pages or not is determined (S2304).

The rebalance processing program, if affirming the determination, detects the identification information of the pool volume to which the pages as the migration target belong with reference to the address management table 3511 (S2306).

Next, with reference to the tables in FIG. 21, whether the pool volumes are the migration source or the migration destination is determined (S2308).

The rebalance processing program, if the pool volumes are the migration destination, saves unused areas for migrating pages from the migration source pool volume in the migration destination pool volume (S2310).

For the pool volume to which the pages are migrated, the one with the low allocation balance is selected but, if multiple pool volumes compete as the migration destinations, the added pool volumes are selected first, and then the pool volumes with the higher priority to be the migration destinations are sequentially selected. In the migration destination priority table, the priority of each pool volume to be the migration destination is registered.

The rebalance processing program, after determining the migration destination pool volume, the migration source pool volume, and the number of migration target pages, determines the page migration schedule, and registers it in the migration execution job of the memory 350 (S2312).

This schedule is, for involving the migration of multiple pages for example, for determining the order of performing the page migration. This schedule is updated and registered each time pages are selected sequentially at S2302 and each time a new migration destination volume or others are determined.

Next, the rebalance processing program increments the count value of a counter (S2316), and determines whether any pages not selected at S2302 still exist or not (S2318).

If any pages not considered yet still exist, the processing returns to step S2302, and further, if there is no page, the migration is performed in accordance with the schedule sequentially updated at S2312 (S2320). Note that the migration processing (S2320) may also be performed after S2312.

It may also be permitted to perform the processing of S2320 between S2312 and S2316.

Figure 24:
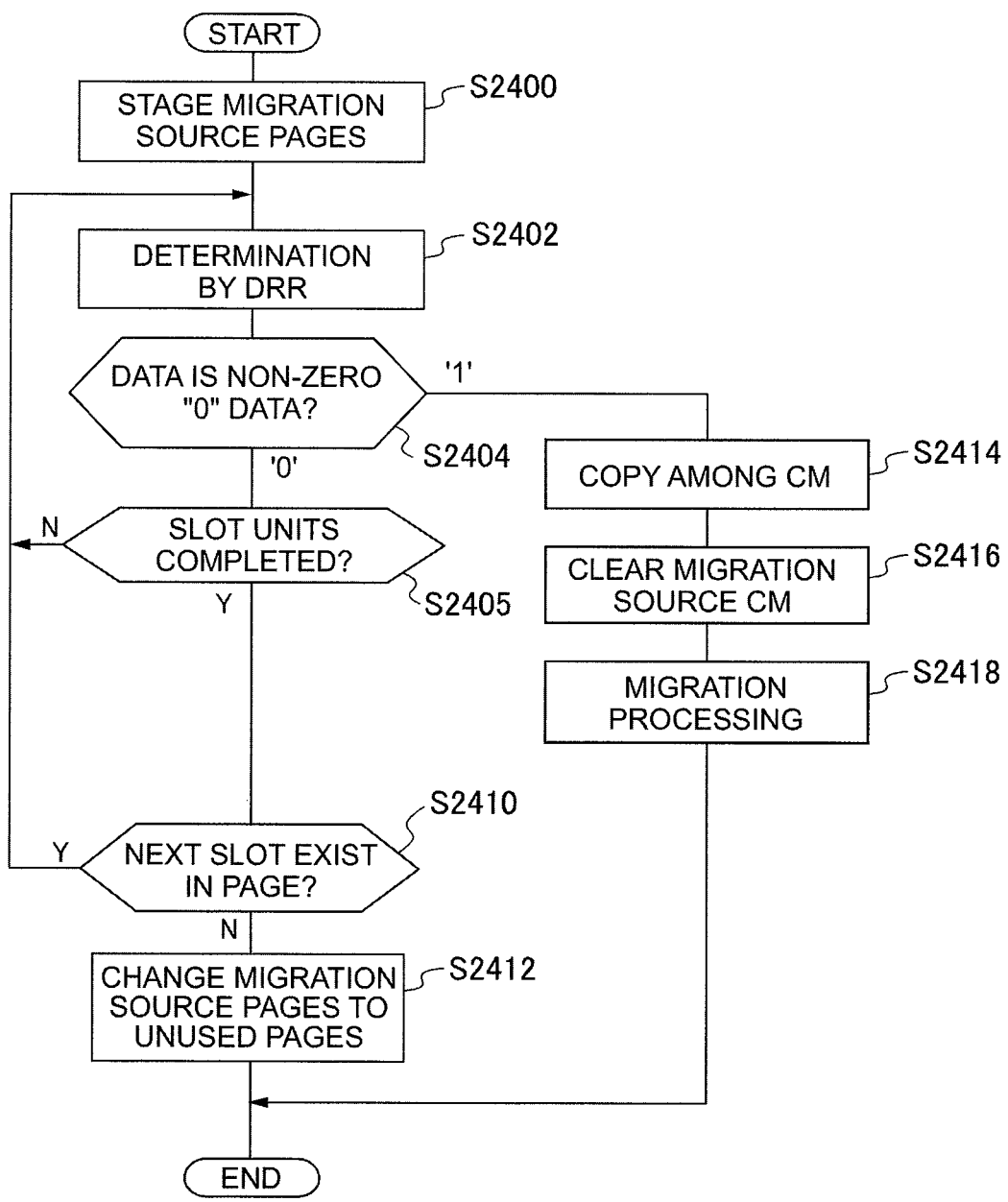
FIG. 24 is a flowchart showing the details of the migration processing including the discard of a fixed data pattern.

FIG. 24 is a flowchart showing the details of the migration processing including the discard of a fixed data pattern. If there are multiple migration source pages, this flowchart is applied to each migration source page.

The storage adapter 370, in accordance with the rebalance processing program, stages all the data in the migration source page from the migration source pool volume to the cache memory 32 in units of slots (S2400).

Figure 26:
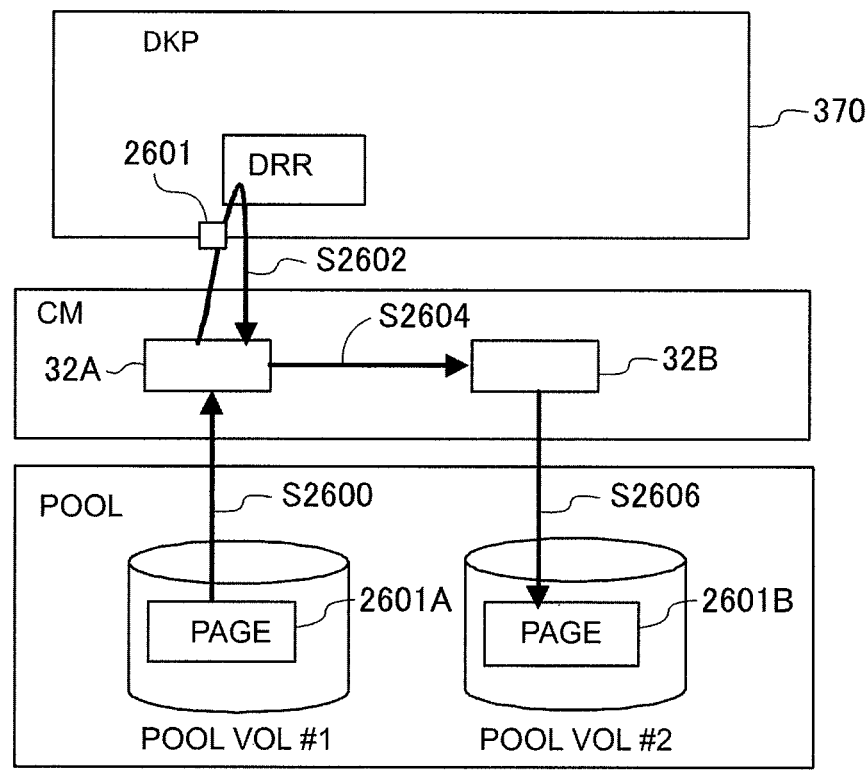
FIG. 26 is a block diagram of a pool and a cache memory for achieving the processing of FIG. 24.

FIG. 26 shows the above-mentioned process. The pool volume #1 is the migration source, and the pool volume #2 is the migration destination. S2600 shows the process of the migration source page being staged to the first area 32A of the cache memory. The reference sign 2601 is a slot. Staging is performed in units of slots. The reference sign 2601A is a migration source page, and the reference sign 2601B is a migration destination page.

The DRR circuit in the storage adapter 370 (Data Recover and Reconstruct circuit) checks the data in the migration source page 2601A in units of slots and checks whether the data is "0" or not (FIG. 24: S2402-S2404, FIG. 26: S2602).

This determination is performed for determining whether the data of the migration source page is one of the fixed patterns (all data is "0") or not. If data is a fixed pattern, page migration is not performed, and mapping for the migration target pages in the virtual volumes is changed to the area exclusive for storing fixed pattern data.

If the DRR detects the existence of "1," the processing shifts to step S2414, and the controller in the cache memory performs the copy between cache memories of the data in the migration source pages from the first area 32A to the second area 32B (FIG. 24: S2414, FIG. 26: S2604). Then, the storage adapter 370 clears the migration source cache memory 32A (FIG. 24: S2416).

Next, the data in the second area 32B is destaged to the migration destination page 2601B of the migration destination pool volume #2 (FIG. 26: S2606), the migration source page 2601A is changed to an unused page, and further, the migration processing is performed such as changing the allocation for the pages in the virtual volume from the migration source page to the migration destination page (FIG. 24: S2418).

When the data of the slot determined by the DRR is "0," the storage adapter 370 determines whether the check for all the data in units of slots is completed or not (S2505), and if it is determined to be negative, the processing returns to step S2402, and checks if the other data in the same slot is "0" or not.

When the check for all the data in the slots is completed, the processing shifts to step S2410, checks whether there are slots remaining in the migration source page or not and, if it is determined to be positive, performs the above-mentioned check for the next slot.

When the determination for all the slots belonging to the page is completed, the processing shifts to step S2412 and, as for the migration source page whose data is all "0," the migration is determined to be unnecessary and is changed to an unused page.

If the storage system performs the processing shown in FIG. 24, when relocating pages, the pages with the fixed pattern data are released from the already used management, which prevents the duplicated allocation of the fixed pattern data to the virtual volume, and consequently, enables the host computer to efficiently utilize the storage areas in the pool volume.

Though the above-mentioned embodiment specifies that the check for the existence of zero "0" data is performed accompanying the parity creation by the circuit (DRR) in the storage adapter 370, it may also be permitted to perform the check by special software or in a special circuit.

In the process of migration described in FIG. 24, if I/O from the host computer or copy I/O in the storage system is issued for the migration source page, the storage system gives priority to the I/O processing and suspends the page migration.

Figure 25:
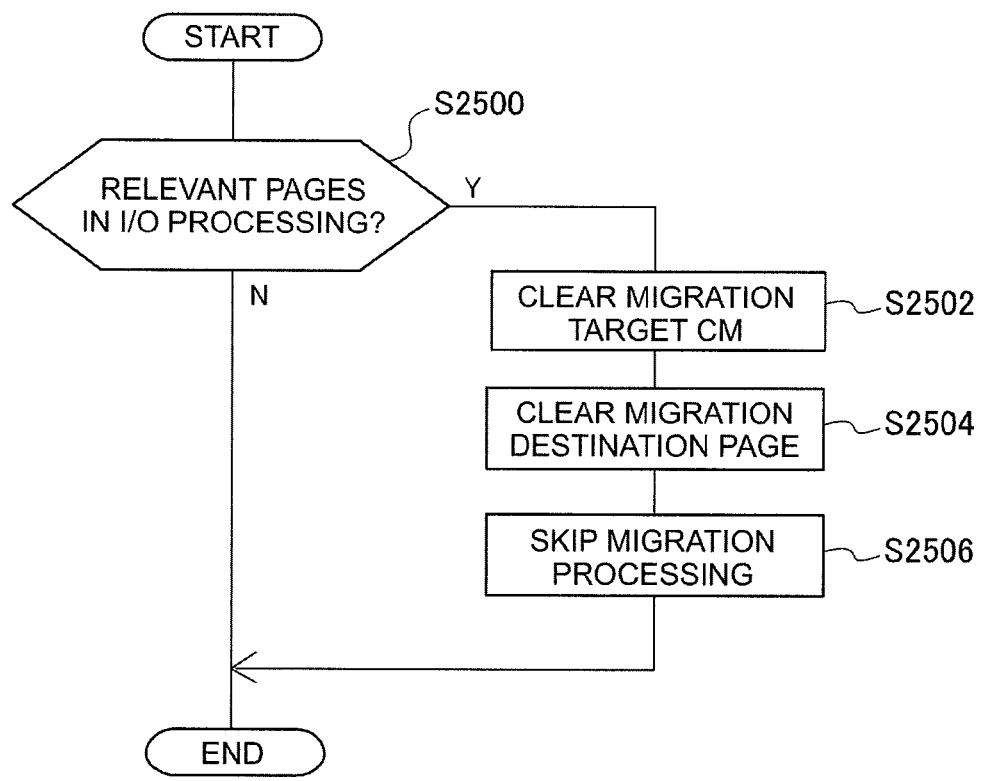
FIG. 25 is a flowchart showing that the I/O processing from the host computer is prioritized over page migration.

That is, as shown in FIG. 25, if read or write I/O is provided to the virtual volume, the processor checks whether the logical address to the migration source page is included or not (S2500).

As the fact that the logical address to the migration source page is included means that the path between the virtual volume and the migration source page is not disconnected and that the page migration processing is not completed, the processor clears the data in the second area of the cache memory (32B in FIG. 26) where the data of the migration source page is stored (S2502), and further, performs the clearing processing for the migration destination page (S2504).

The clearing processing described here, if the mapping is for the virtual volume, means the deletion of the mapping management information and, if the migration destination page is managed as the used page, means the deletion of the management information.

Next, the processor, at S2506, skips (completes) the migration processing in FIG. 24. Note that, as for read I/O, it may also be permitted to suspend the migration processing until this processing is completed and then to resume it.

As described in FIG. 26, the cache memory 32 includes the first area (cache area for the migration source) 32A and the second area (cache area for the migration destination) 32B and, as the data in the migration source page of the second area is not copied to the migration destination page 2601B until there is no difference between them, the page migration processing can be suspended when I/O reaches the migration source page.

Figure 31:
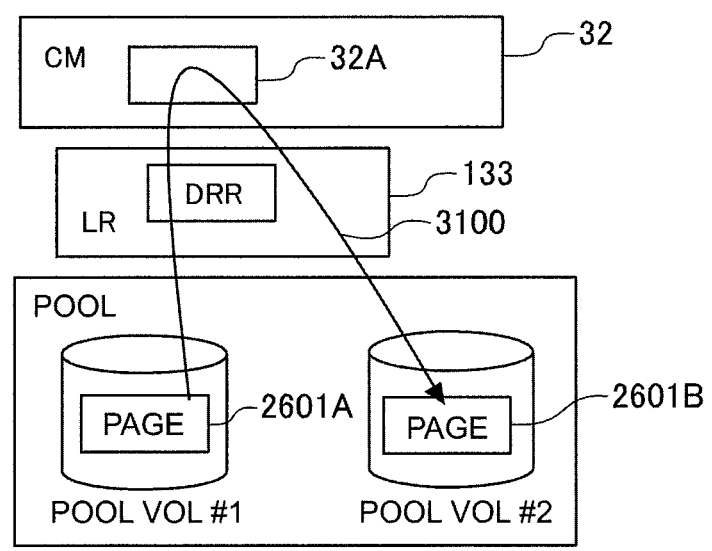
FIG. 31 is a block diagram related to a variation of FIG. 26.

Meanwhile, in the cache memory configuration shown in FIG. 31 (form in FIG. 9), as the DRR of the local router (LR) 133 performs the detection of zero "0" data and the processor destages the data staged to one cache area in the cache memory 32 directly to the migration destination page 2601B without using any other cache areas, the page migration can be performed faster than the migration in the cache memory structure in FIG. 26 but, at the same time, even if I/O accesses the migration source page 2601A from the host computer, it is difficult to suspend the page migration.

In the case of FIG. 31, similarly, the data for which the check for zero "0" is completed is accumulated in the cache memory and, if the result is not zero, is stored in the pool volume #2. The diagonal write shown in FIG. 31 is faster.

Figure 32:
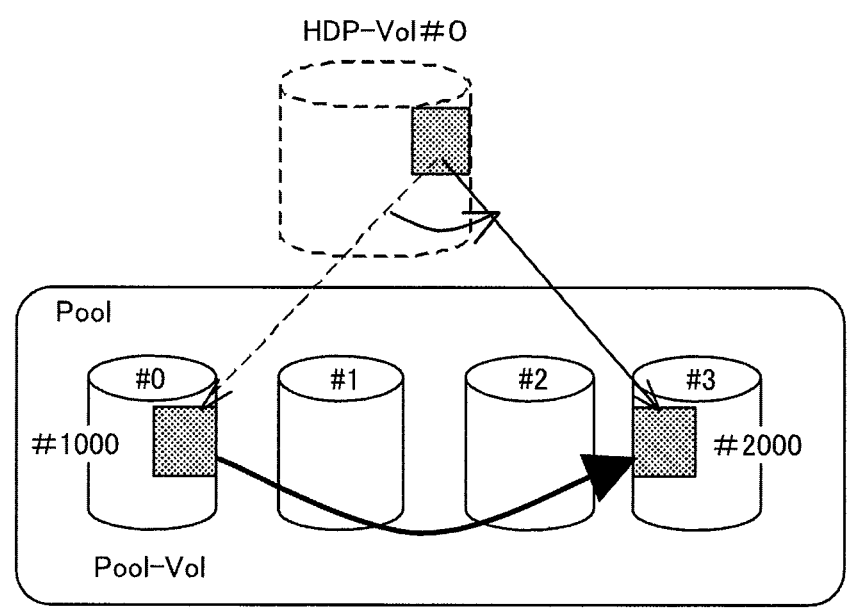
FIG. 32 is a block diagram showing the process of page migration among multiple pool volumes and is the precondition for FIG. 33.
Figure 33:
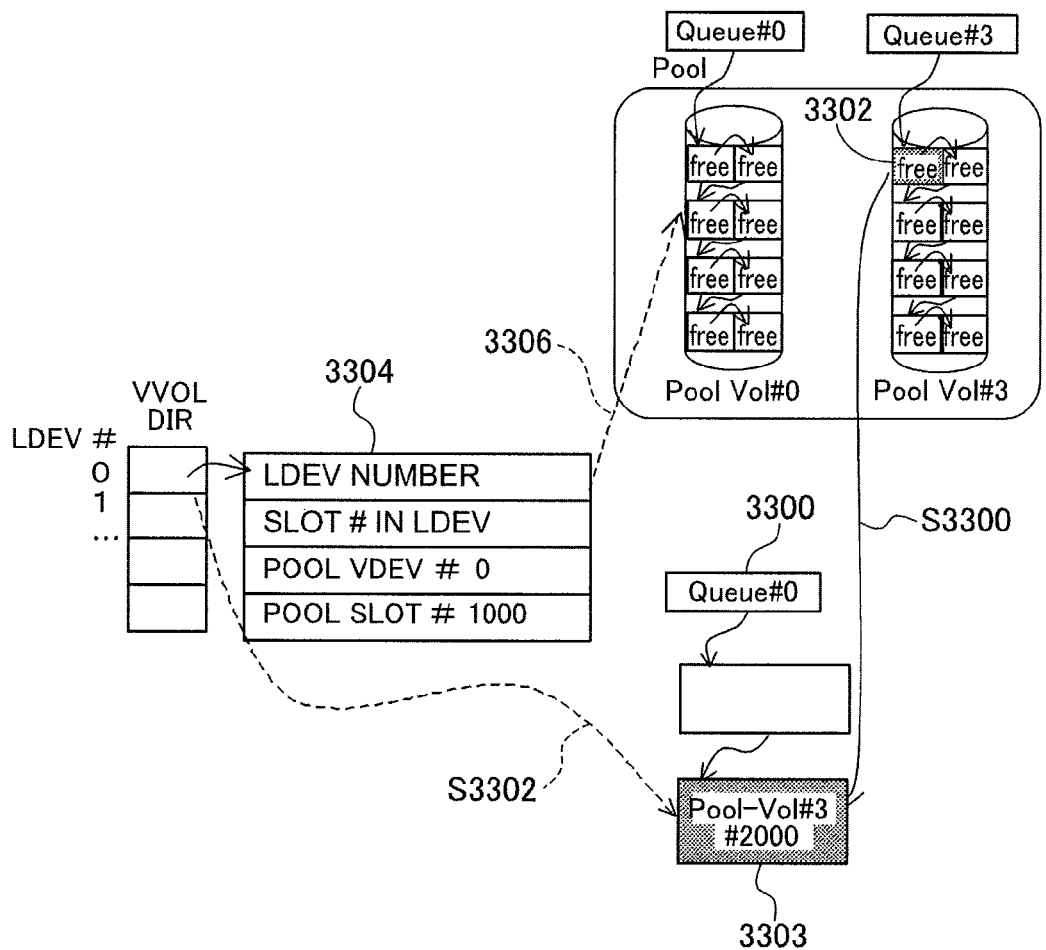
FIG. 33 is a block diagram showing the free queue processing for achieving the page migration.

Next, the page migration processor of S2418 in FIG. 24 is described with reference to the unused queues. This description assumes the migration shown in FIG. 32. That is, the process in which the data of the page #1000 in the pool volume #0 is copied to the page #2000 in the pool volume #3 and the mapping to the former page in the virtual volume (HDP Vol #0) is changed to the mapping to the latter page is described with reference to FIG. 33.

The rebalance processing program 3509 saves an in-migration queue, connects it to the unused queue #3, then, from the unused areas connected to the unused queue #3 allocated to the pool volume #3, selects the target area 3302 to be the migration destination page, and connects this pointer information (Pool-Vol #3, #2000) 3303 to the end of the in-migration queue (queue #0) 3300 (S3300). The area to be the migration destination page is managed by a different queue from the unused queue for preventing the area to be the migration destination page from being allocated to the virtual volume.

When the rebalance processing program receives the report that the page data migration was normally completed from the copy job, the pointer information 3304 which is the information of the mapping 3306 for the page in the VVOL-DIR (pool volume #0, page #1000) is cleared, changed to the pointer information for the address of the migration destination page (Pool-Vol #3, #2000) (S3302), and inserts the address of the migration source page in the appropriate position in the queue structure of the unused queue #. Furthermore, the migration destination page is released from the in-migration queue.

Figure 34:
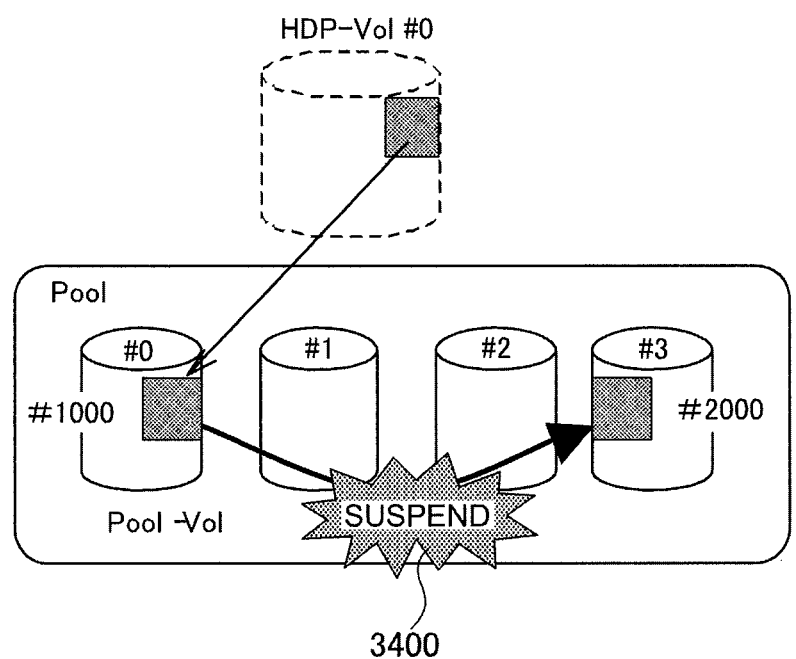
FIG. 34 is a block diagram of the precondition for FIG. 35.
Figure 35:
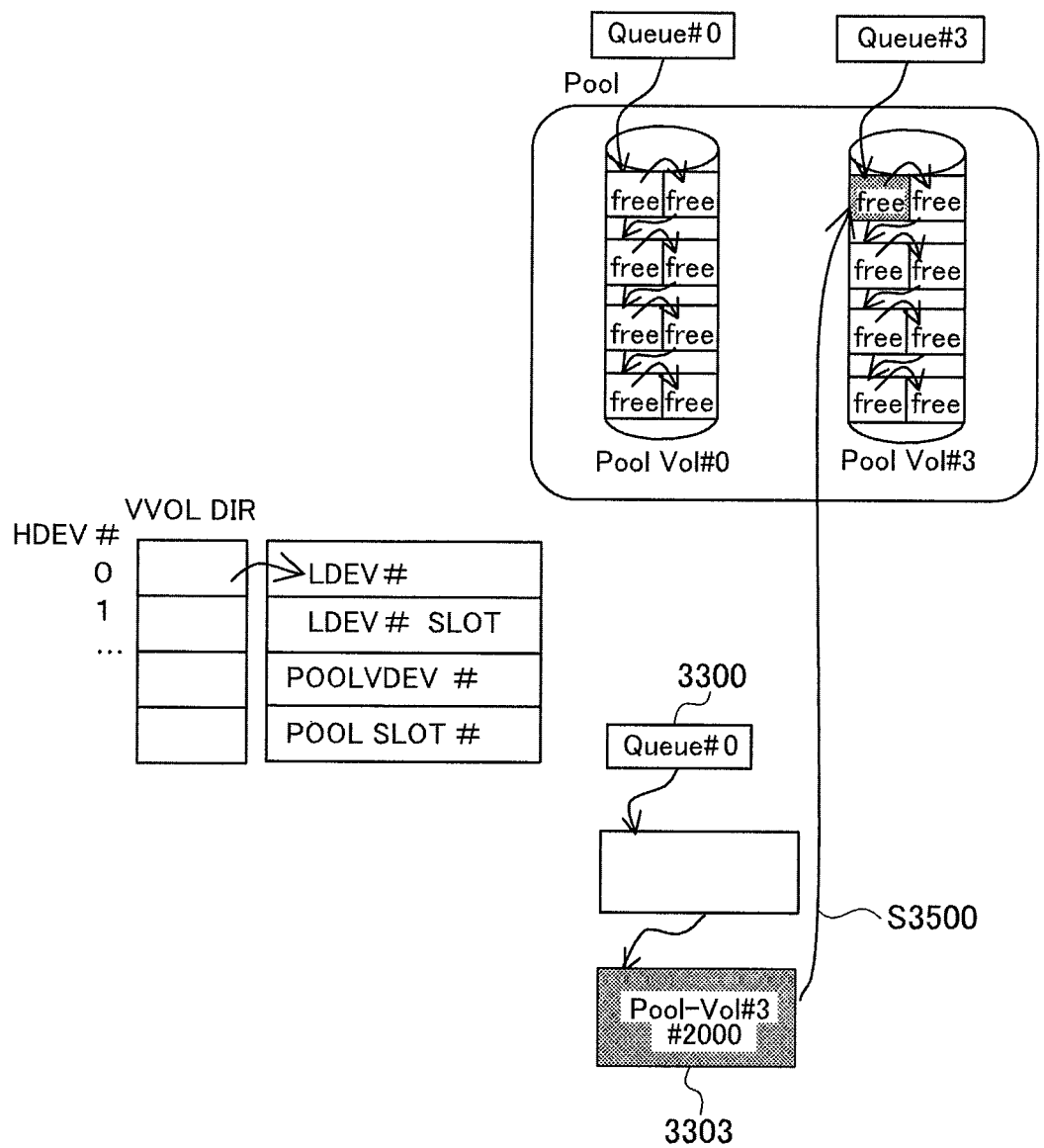
FIG. 35 is a block diagram showing the free queue processing in the case that the migration is suspended.

As shown in FIG. 34, if the process of the data migration from the migration source page to the migration destination page is suspended (3400) due to I/O from the host computer or other causes, as shown in FIG. 35, the rebalance processing program saves an in-migration queue, clears the pointer information 3304 set for the migration destination queue, and returns it to the information before the change.

Furthermore, the program saves the unused queue #3 of the pool volume where the migration destination page 3303 originally existed and, for this unused queue, searches for the position for inserting the migration destination page 3303 as an unused area.

The rebalance processing program connects the in-migration queue 3300 to the unused queue (Queue #3), releases the migration destination page 3303 from the in-migration queue 3300, and further, connects the migration destination page to the unused queue (Queue #3).

As mentioned above, the storage system, by utilizing an in-migration queue which is a different queue from a unused queue, can achieve the page relocation as well as, even if the factors such as host I/O competing with the page relocation are added to the storage system, give priority to the I/O processing.

Next, using FIGS. 27A, 27B, and 27C, for virtual volumes and pool volumes, the details of the allocation processing to fixed data patterns are described below. As a fixed data pattern, the example of the pattern in which all data in the page is zero "0" is used below.

Figure 27A:
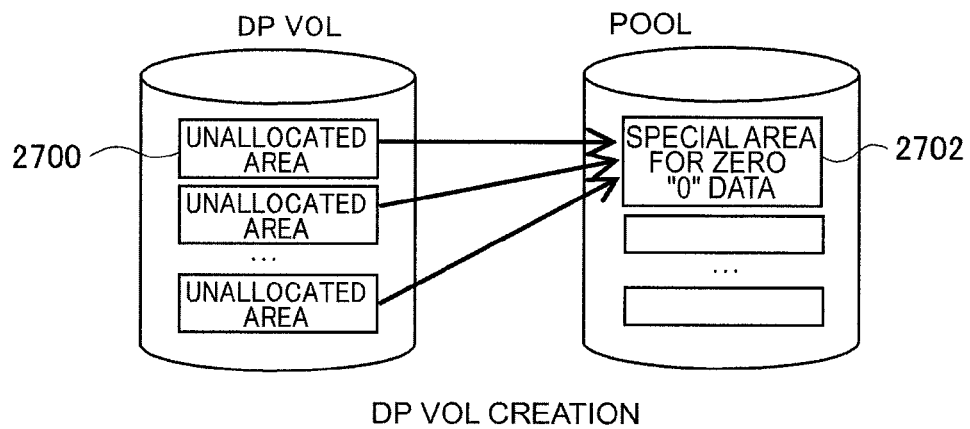
FIG. 27A is a block diagram of a virtual volume and a pool volume showing the case where unused areas of the virtual volume are allocated to the special area for zero "0" data of the pool volume.

FIG. 27A is a block diagram showing the creation of a virtual volume (DP VOL). The storage system allocates all the unused areas (unused pages) 2700 in the virtual volume to the special area 2702 for zero "0" data in the pool volume.

The special area for zero "0" data may be set in at least one volume in the pool or in the cache memory. If a read request comes from the host computer to the unallocated area in the virtual volume, the storage system reads the special area for zero "0" data in the pool volume and returns zero "0" data to the host computer.

Figure 27B:
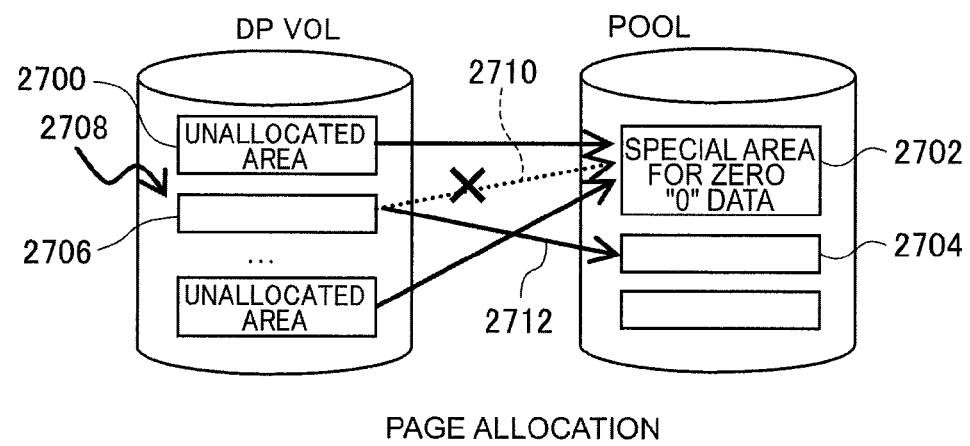
FIG. 27B is a block diagram showing the case where unused areas of the pool volume are allocated to the virtual volume.

As shown in FIG. 27B, the storage system, if receiving a write request from the host computer to the unallocated area in the virtual volume, selects an unused page in the pool volume and stores the write data in it.

The storage system changes the allocation destination of the page 2706 of the virtual volume which received the write request 2708 from the "special area for zero '0' data" 2702 to the allocated area 2704. That is, the storage system releases the allocation 2710 and sets a new allocation 2712 in the management table. If the write request is all zero "0" data, the allocated area 2704 in the pool volume is overwritten by all zero "0" data.

Figure 27C:
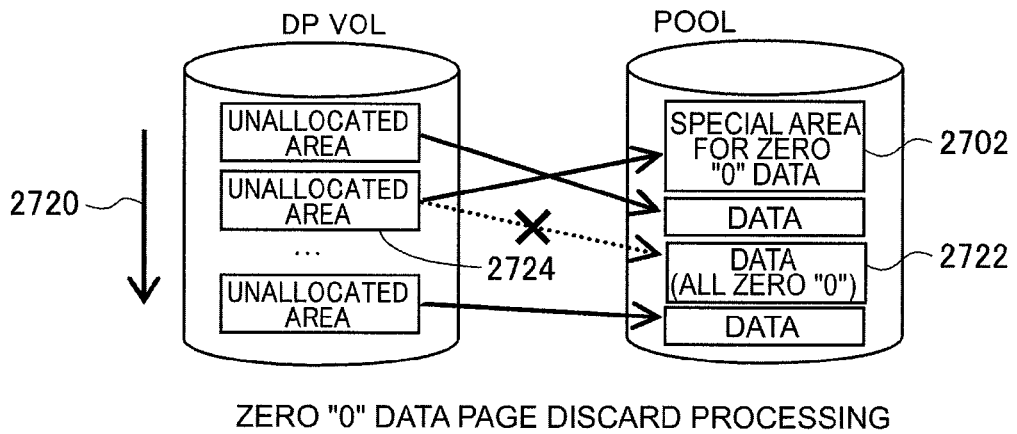
FIG. 27C is a block diagram showing the processing for the case that the allocated pages in the pool volume only include zero "0" data.

Next, as shown in FIG. 27C, the storage system searches the virtual volume starting with the head page to see whether the data in the pages of the allocated pool volume is all zero "0" or not (2720) and, if any page 2722 whose data is all zero "0" is detected, changes the allocation destination of the page 2724 of the virtual volume from the currently allocated page 2722 to the special page 2702 as the "special area for zero '0' data."

The page whose data is all zero "0" in the pool volume is managed as an unused area, not an already used area. Though this "zero '0' data page discard processing" was performed accompanying the page rebalance processing as shown in FIG. 24, it may also be performed independently of the page rebalance processing.

At this point, if the imbalance occurs to the page allocation ratio among the multiple pool volumes due to the "zero '0' data page discard processing," the rebalance processing is applied as shown at S3309 in FIG. 14 and FIG. 22.

Figure 28:
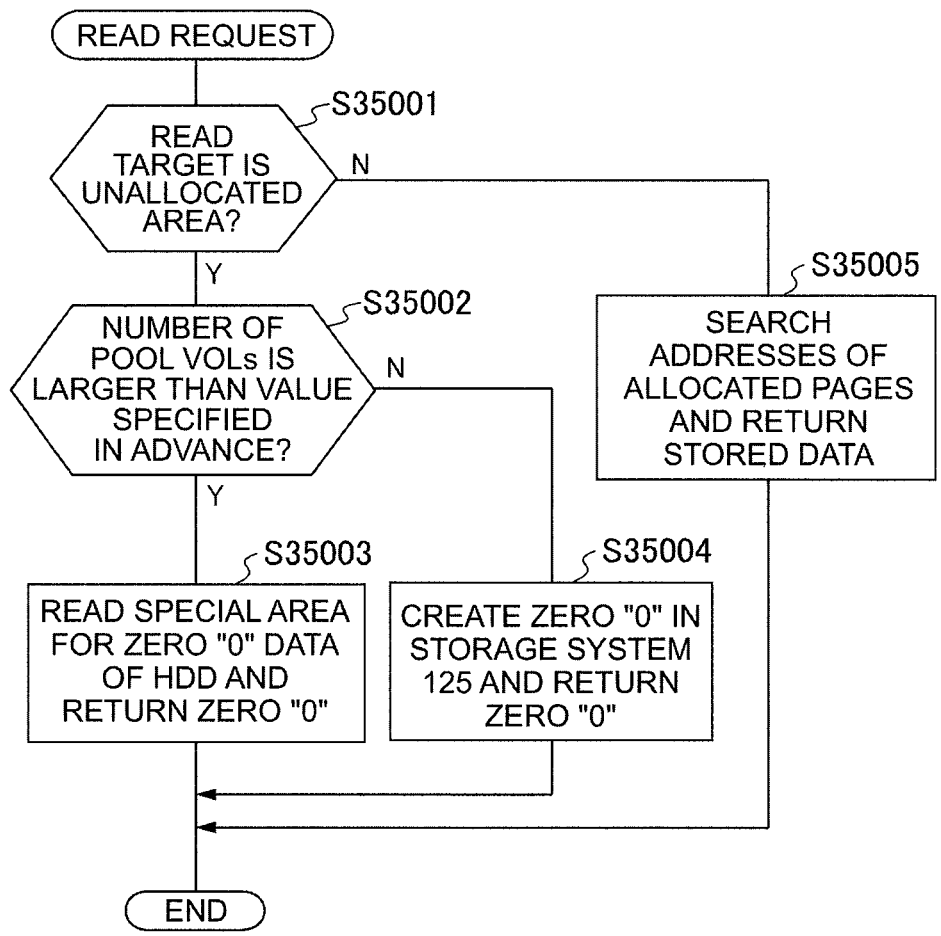
FIG. 28 is a flowchart showing the read processing for a special area for zero "0" data.

FIG. 28 is a flowchart showing the read processing for a special area for zero "0" data. The processor 360 determines whether a read request to the virtual volume from the host computer is for an unused area or not (S35001). If this is determined to be negative, the processor 360 searches for the address of the allocated area of the pool volume and returns the data of the searched page to the read request (S35005).

Meanwhile, if the read target is an unallocated area, the all zero "0" data is returned to the host computer and, at step S30552, the number of pool volumes allocated to the virtual volume is checked.

This determination is attributed to the fact that there are multiple methods for setting special areas for zero "0" data. The first method is for setting special areas for zero "0" data in only the head pool volume of the pool. The second method is for setting special areas for zero "0" data in all pool volumes of the pool.

If the number of pool volumes where special areas for zero "0" data are set is small (such as due to the first method or the second method for few pool volumes), the read load on the PDEVs (storage systems) becomes larger, and therefore, the storage system creates zero "0" data and returns to the host computer (S35005). The storage system creates zero "0" data, for example, in the memory (cache memory). Whether the number of the pool volumes in which special areas for zero "0" data are set is large or small is determined in comparison with the specified value.

Meanwhile, if the number of pool volumes where special areas for zero "0" data are set is large, the read load is distributed among the multiple pool volumes, and therefore, the storage system reads the physical areas corresponding with the special areas for zero "0" data in the pool volumes, and returns the zero "0" data to the host computer (S35003).

Note that, if the storage systems have the high-speed read performance (e.g., SSDs), the read load can be ignored, and therefore, the processor has only to go to the storage systems to read zero "0" data regardless of the number of pool volumes. This is possible by managing the read characteristic of the storage system for each pool.

In other cases, if HDDs with the high rotation rate and HDDs with the low rotation rate are mixed and allocated to a pool, it is possible to set special areas for zero "0" data in the pool or the pool volumes set in the HDDs with the high rotation rate and map the unallocated areas of the virtual volume to this.

Figure 29:
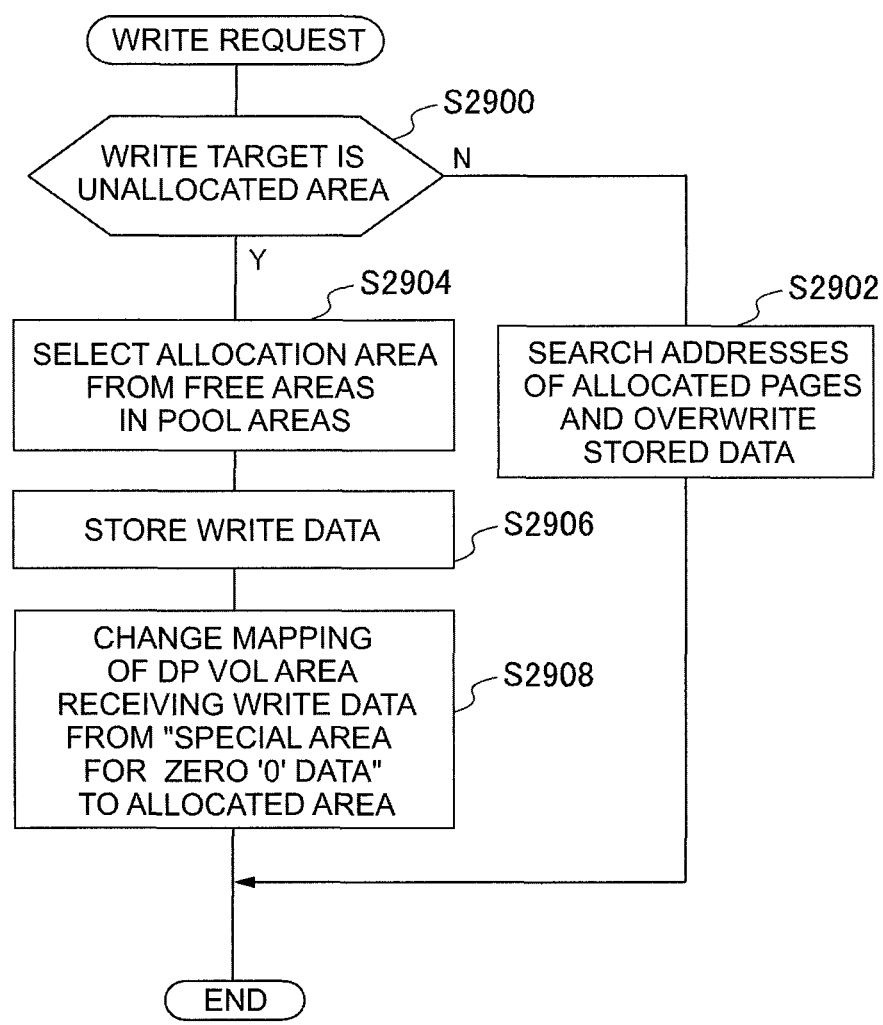
FIG. 29 is a flowchart showing the processing for the case where a write request is issued from the host computer to the unallocated area of the virtual volume.

FIG. 29 shows the processing (FIG. 27B) for the case where a write request is issued from the host computer to an unallocated area of the virtual volume. The storage system determines whether the write target of the virtual volume is an unallocated area or not (S2900). If this is determined to be negative, the address of the page allocated as the write target page of the virtual volume is searched and the page is overwritten with the write data (S2902).

Meanwhile, if this is determined to be positive, a page is selected from the unused areas of the pool volume (S2904), and stores the write data in it (S2906). The page of the virtual volume which received the write request changes the mapping management information from the "special area for zero '0' data" to the page of the pool volume (S2908).

In the above-mentioned embodiment, when migrating the pages allocated to the migration source pool volume to the migration destination pool volume, if the migration target pages have a fixed data pattern, the migration target pages are released without being migrated, and the pages of the virtual volume are mapped to the area storing the fixed data pattern of the migration destination pool volume.

Furthermore, the storage system, if pool volumes are added to the pool, may also be permitted to perform the rebalance processing for the special areas for zero "0" data triggered by the page migration among the multiple pool volumes.

Figure 30A:
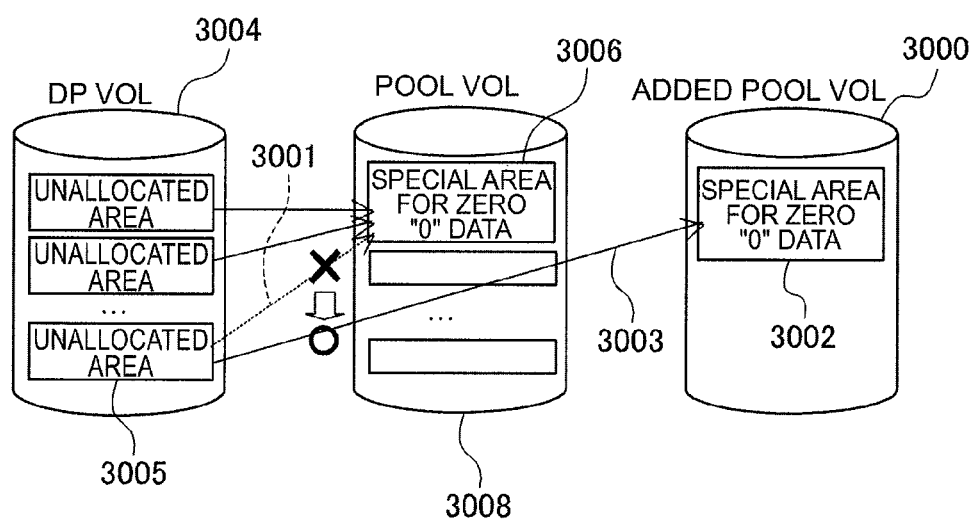
FIG. 30A is a block diagram of a virtual volume and pool volumes showing the case where a special area for zero "0" data is set in an additional pool volume.

That is, as shown in FIG. 30A, a special area 3002 for zero "0" data is set in the added pool volume 3000, and the mapping 3001 which was set to the special area 3006 for zero "0" data in the existing pool volume 3008 from the unallocated area 3005 in the virtual volume 3004 is changed to the mapping 3003 to the special area 3002 in the added pool volume 3000.

Therefore, the mapping from the unallocated area of the virtual volume to the special area for zero "0" data is performed equally for the multiple pool volumes including the added pool volumes.

Figure 30B:
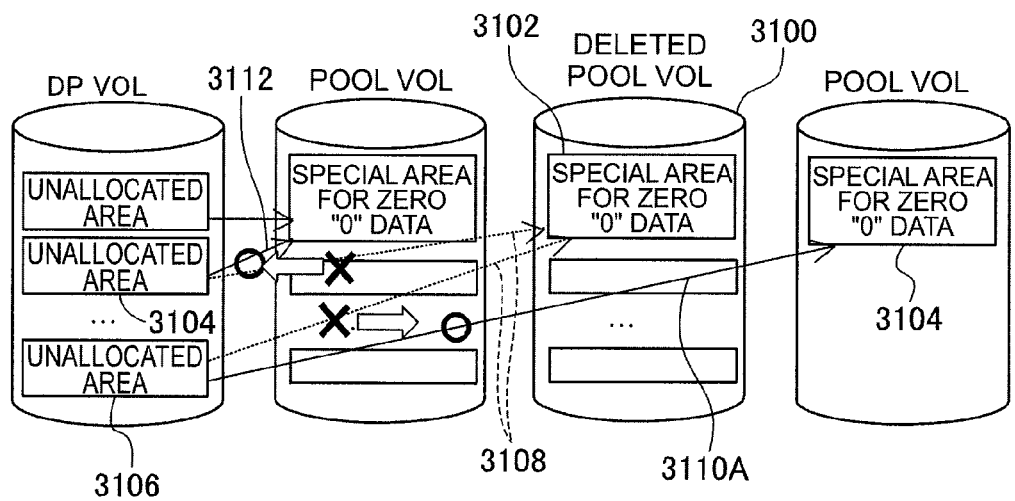
FIG. 30B is a block diagram showing the case where a special area for zero "0" data is allocated to a pool volume to be deleted.

Furthermore, as shown in FIG. 30B, if the pool volume 3100 is deleted, the used pages of the deleted pool volume are equally relocated to the remaining pool volumes, and at this point, the mapping from the unallocated areas 3104 and 3106 of the virtual volume corresponding with the special area 3102 of the deleted pool volume is also changed equally to the mapping to the special areas 3102 and 3104 of the remaining pool volumes (3110A, 3112).

As mentioned above, by distributing the allocation of the special areas for zero "0" data to pages in the virtual volume among the multiple pool volumes, when there is a write access to the virtual volume, it becomes possible to release the allocation of the unused areas of the virtual volume from the special areas for zero "0" data and then to distribute the processing for allocating the unused areas to the unused areas in the pool volumes among the multiple pool volumes.

FIG. 36 is a management table for the migration progress management (S7013 in FIG. 15). The rebalance processing program registers the management information in this management table, and updates the registered management information. The progress of this migration is provided to the administrative user by the display on the screen. The management information includes the information whether each pool "is performing migration or not," which can be described more specifically as below.

Rebalance in progress: the rebalance processing is in progress.

Rebalance not performed: (1) rebalance is not performed yet or (2) not included in the target of rebalance.

Rebalance uncompleted: (1) the rebalance processing is suspended (due to a failure, the user's command or other causes) and the whole plan is not completed yet, (2) the planned rebalance processing is completed till the end but some pages were skipped, (3) the power is turned OFF, etc.

Furthermore, if the rebalance processing fails, it may also be permitted to display that the rebalance is suspended on the screen, to give the user the timing for resuming the rebalance processing, and to provide the information of the migration target pools, that is, how many HDP VOLs of all the HDP VOLs have been migrated.

Figure 37:
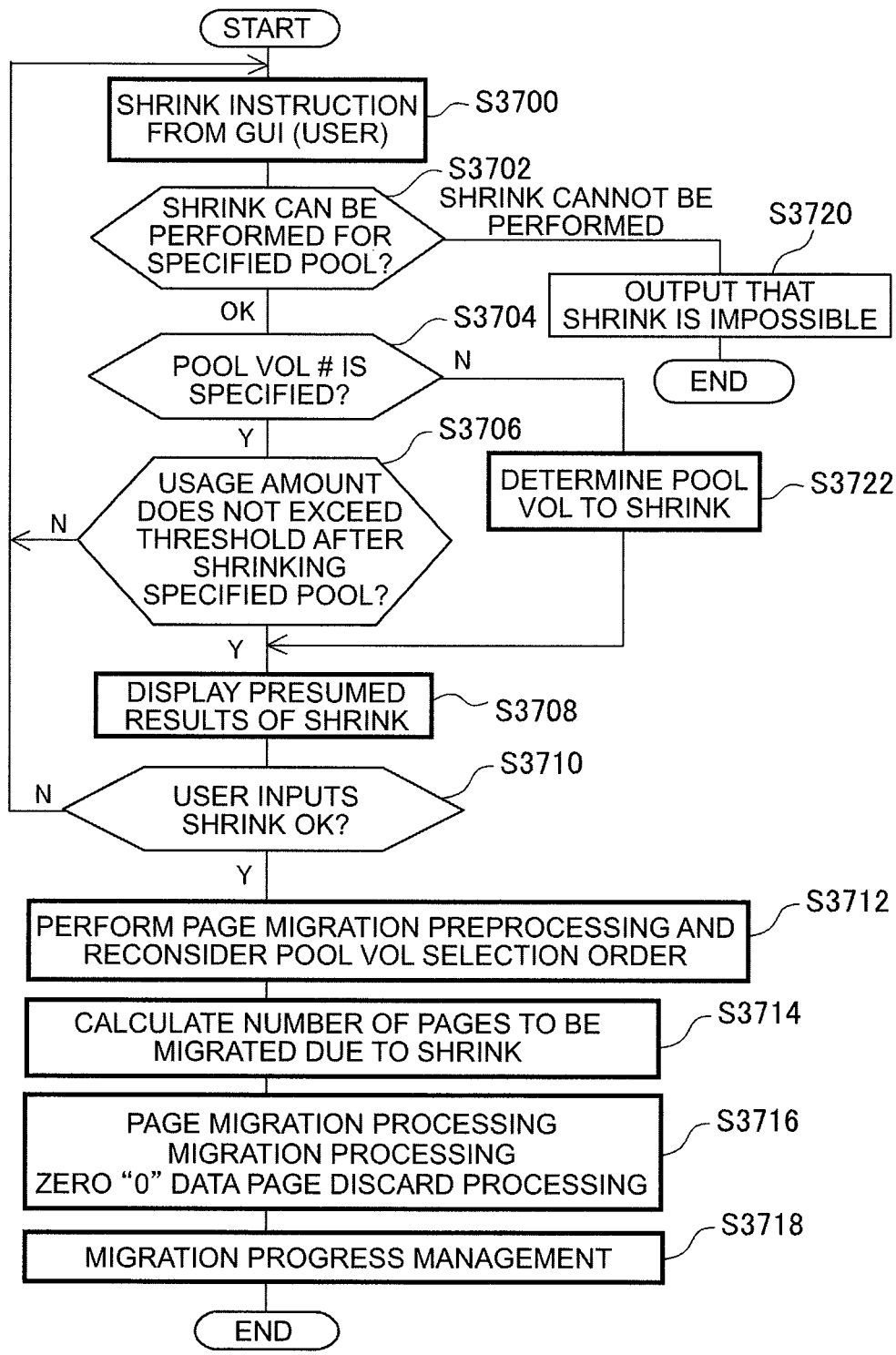
FIG. 37 is a flowchart showing the pool volume shrink processing with rebalance taken into consideration.

Next, the processing for deleting the pool volumes ("Shrink") in FIG. 14 is described in details below. FIG. 37 is a flowchart showing the pool volume shrink processing with rebalance taken into consideration. The shrink processing for pool volumes is performed by the user's command via the GUI.

FIG. 38 is an example of the information provided to the user by the GUI, including the characteristics of the pool and the pool volumes. With reference to this information, the user specifies the pool volume to shrink, the pool to which the pool volume belongs, the capacity to shrink, the page usage rate in the pool after the pool volume is shrunk, and others.

The page usage rate is the ratio of the number of pages actually allocated to the virtual volume of the total number of pages that can be allocated to the pool volumes in the pool. The shrink processing is performed for pool volumes.

When the conditions for the shrink processing are issued to the rebalance program (S3700), whether the shrink processing can be performed for the shrink target pool or not is determined (S3702).

Such status is referred to by accessing the pool management information and the pool volume management information. For example, if the pool or the pool volume is blocked, or if the I/O from the host computer or the copy I/O in the storage system exists in the pool volume belonging to the pool, the GUI of the service terminal in the management server or the storage system reports to the user that the shrink is impossible to perform (S3720).

If the shrink is determined to be possible, the rebalance processing program checks whether any pool volume is specified by the user at step S3704 or not. If a pool volume is specified and the page usage amount or the usage rate of the entire pool does not exceed the threshold even if the specified pool volume is deleted from the pool, the rebalance processing program shifts to step S3706, presumes the characteristics of the pool and the pool volume after performing the shrink, and displays it for the user via the GUI (S3708).

FIG. 39 is an output example of the presumed results of the shrink processing. The data of the pool capacity, the usage amount, the unused capacity, and the unused capacity rate before the shrink processing is collected from the pool management information. The unused capacity rate is calculated with reference to the pool capacity and the unused capacity.

The pool capacity, the usage amount, the unused capacity, the unused capacity rate after the shrink processing are calculated with reference to the capacity, usage amount, and the unused capacity of the shrink pool volumes specified by the user or all the pool volumes specified by the storage system as the shrink target in the pool volume management table and subtracted from the pool information.

If it is determined at S3704 that the pool volume to be deleted is not specified by the user, which pool volume to delete is determined when the storage system receives the capacity to be deleted from the user.

For example, when the expected usage amount is input, the storage system calculates the capacity to be deleted for making the current usage amount the expected usage amount, and determines which pool volume to delete. If the storage system selects pool volumes, the amount of migration can be kept small by selecting pool volumes in the ascending number of allocated pages.

The storage system checks whether the pool usage amount does not exceed the threshold (e.g., 80% of the total capacity or larger) even if the target pool volume is shrunk.

The deletion request which causes the usage amount to exceed the threshold is rejected. If the user inputs the pool volume #** and if the deletion of the pool volume specified by the user causes the usage amount to exceed the threshold, the deletion request from the user is rejected.

Furthermore, if, by performing the shrink processing, the number of pool volumes becomes equal to or less than the specified value (e.g., 8), the rebalance function is not fully utilized, and therefore, if the number of the remaining pool volumes is likely to be equal to or less than the specified value, the warning for the user is issued.

When the values shown in FIG. 39 are displayed on the screen, the user confirms whether the input condition, i.e., the specified pool volume may be shrunk and, if this is approved, the user inputs "Continue" on the GUI (S3710). By this method, the shrink plan is determined, and the storage system starts the shrink processing and the rebalance processing.

Figure 40:
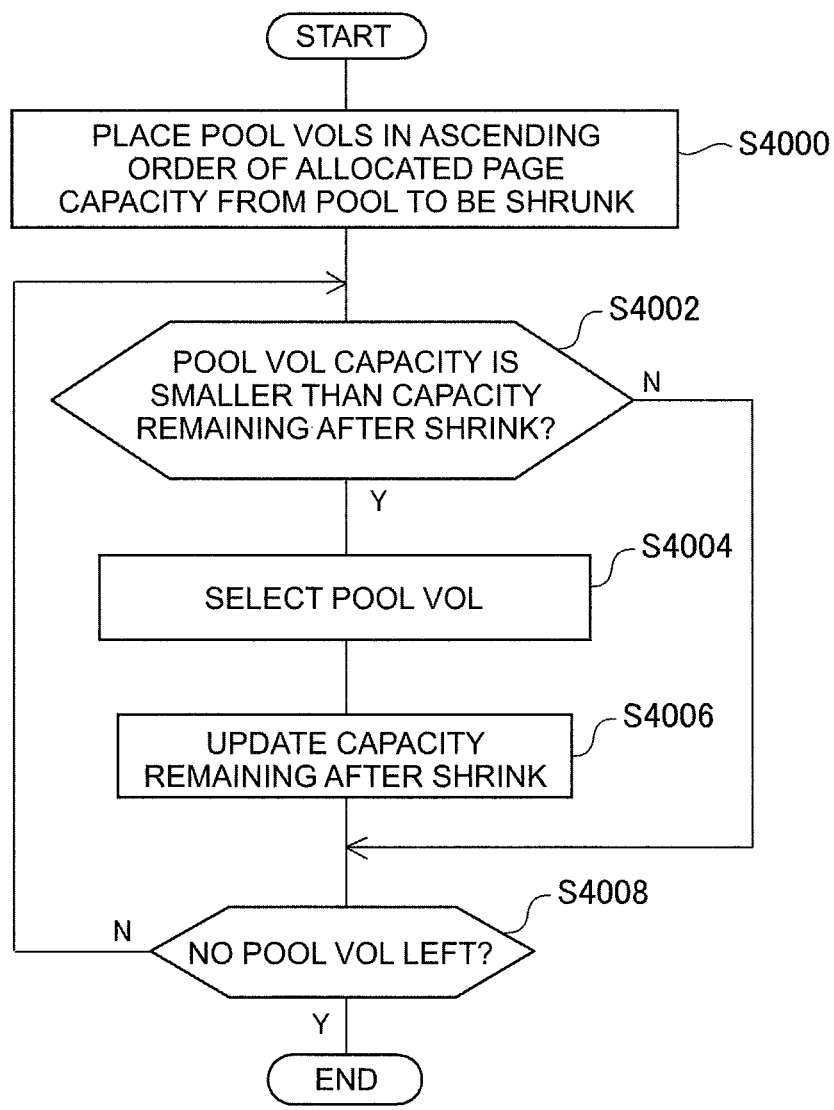
FIG. 40 is a flowchart showing the details of the processing in which the storage system determines which pool volume to shrink.

If the pool volume is not specified at step S3702, the storage system determines the pool volume to be shrunk (S3722). FIG. 40 is a flowchart showing the details of the processing for achieving it.

The rebalance processing program determines the pool volumes to shrink in the range of not exceeding the shrink capacity. From the pool to be shrunk, the pool volumes are placed in the ascending order of allocated page capacity (S4000).

Next, the rebalance processing program compares the capacity of the pool volume with the smallest allocated page capacity with the capacity to be shrunk (the initial capacity or, after the shrink, the rest of the shrink) and, if the pool volume capacity exceeds the capacity to be shrunk, shifts to step S4008, selects another pool volume, and retries step S4002.

Meanwhile, if the pool volume capacity is smaller than the capacity to be shrunk, this pool volume is selected as the shrink target volume (S4004), subtracts the capacity of the selected pool volume from the capacity to be shrunk, updates the remaining capacity to be shrunk (S4006), proceeds to step 4008, and performs the processing at step 4002 for the pool volume with the second smallest page capacity. The processing shown in FIG. 40 is performed for all the pool volumes belonging to the shrink target pool.

If, in accordance with step S3710 in FIG. 37, the user performs the input approving the shrink for the storage system, afterward, the preprocessing of the page migration processing including the pool volume deletion processing is performed.

Next, the processing shifts to step S3714, and calculates the number of pages to which the migration including the shrink processing is applied. Furthermore, at step S3716, the page migration is performed, and the migration progress management is performed at step S3718. The processing from S3712 to S3718 is nearly the same as the processing described in FIG. 15.

Figure 41:
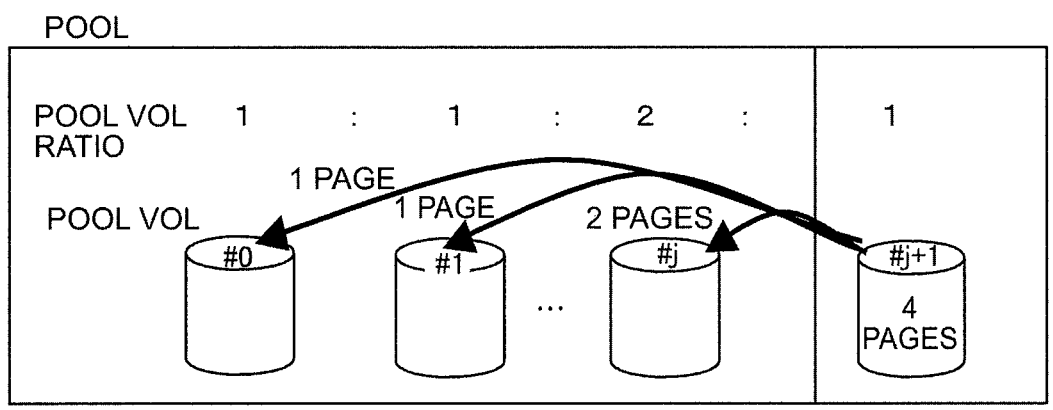
FIG. 41 and FIG. 42 are block diagrams showing the rebalance processing including the reduction of pool volumes.
Figure 42:
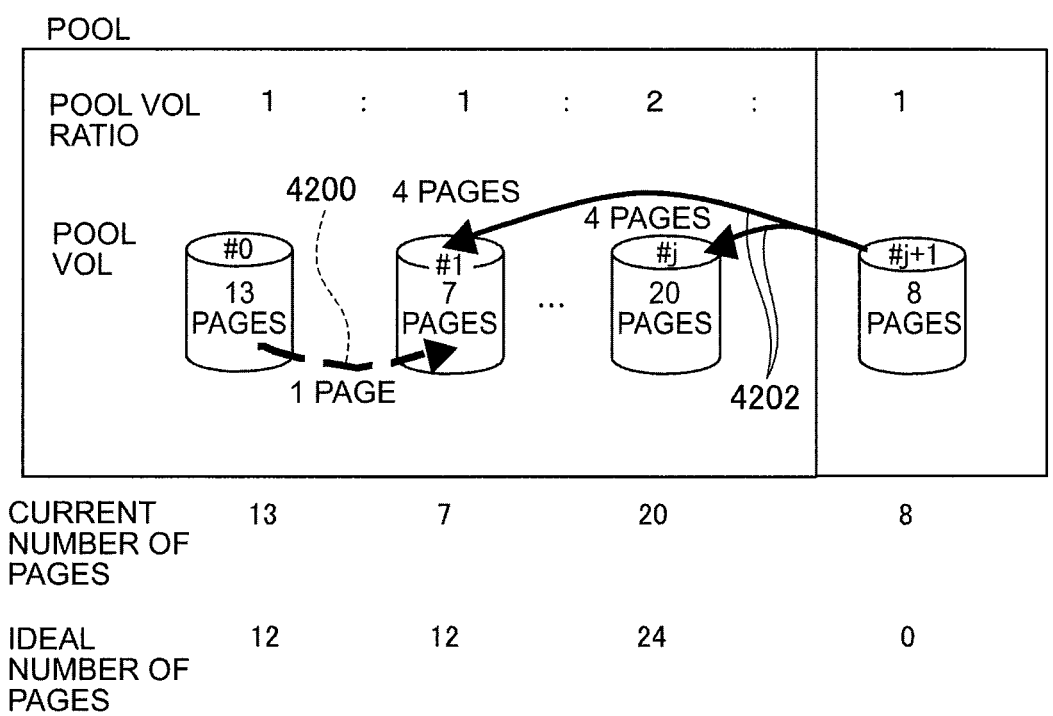

FIGS. 41 and 42 are block diagrams showing the rebalance processing including the reduction of pool volumes. FIG. 41 shows that the pool volume #j+1 is deleted from the pool. In accordance with the capacity ratio of the remaining pool volumes, the number of used pages (4 pages) included in the pool volume #j+1 is migrated to the existing pool volumes at the rate shown in FIG. 41.

As shown in FIG. 41, firstly, multiple pages are distributed from the pool volume to be deleted to the pool volumes in accordance with the capacity ratio of the migration destination pool volumes.

At this point, the storage system, as shown in FIG. 42, for making the actual number of allocated pages for the multiple pool volumes the ideal number of pages, performs the page migration 4202 by shrinking pool volumes and the page migration by the rebalance processing in a balance.

Figure 43:
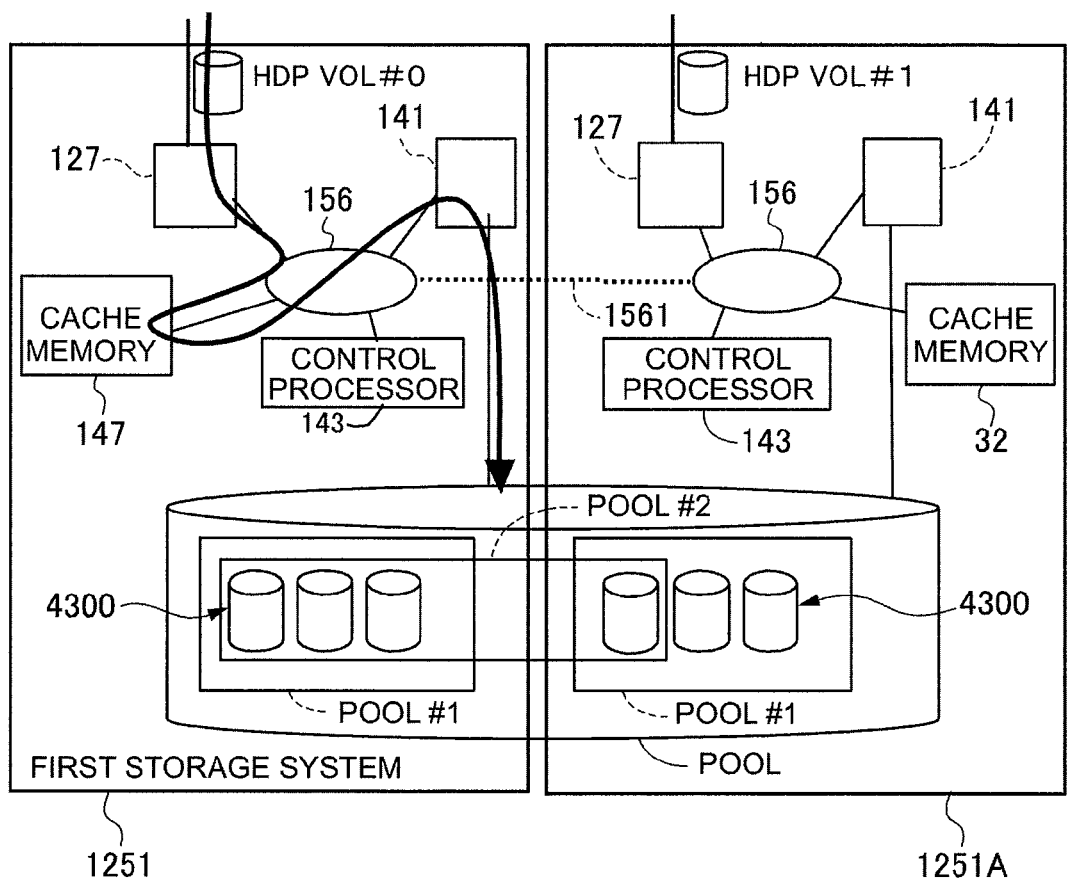
FIG. 43 is a hardware block diagram showing that the storage system shown in FIG. 9 includes multiple clusters.

FIG. 43 shows a variation example of the above-mentioned embodiment and is a hardware block diagram showing that the storage system shown in FIG. 9 includes multiple clusters. The first cluster 1251 controls the rebalance for the first virtual volume (HDP VOL #0), and the second cluster controls the rebalance for the second virtual volume (HDP VOL #1).

The pool #0, the pool #1, and the pool #3 are created in each cluster or over multiple clusters. The rebalance processing may be performed for all of these multiple pools at the same time or for each of the pools separately.

For example, if the pool volume group #2 is in use and pool volumes are added to the pool volume group #0, the data of the pool volumes included in the pool volume group #1 in the pool volume group #2 is migrated to the pool volumes in the pool volume group #0, and the pool volume group #2 is made the pool volume group #0. It may also be permitted to reduce the number of pool volumes in the pool volume group #1.

That is, in the embodiment in FIG. 43, pools are created over clusters. Among the pool volumes belonging to the pool, as many pages as possible are supposed to be allocated to the pool volumes in the same cluster as the virtual volume.

This is performed because no data transfer over clusters occurs if the real data is in the same cluster. Nevertheless, if there are no enough pool volumes, the pool volumes in other clusters are used, but the range of exceeding the cluster is made as small as possible.

If pool volumes are added when pool volumes exist over multiple clusters, the rebalance is performed for including the data stored outside the cluster in the cluster.

Figure 44:
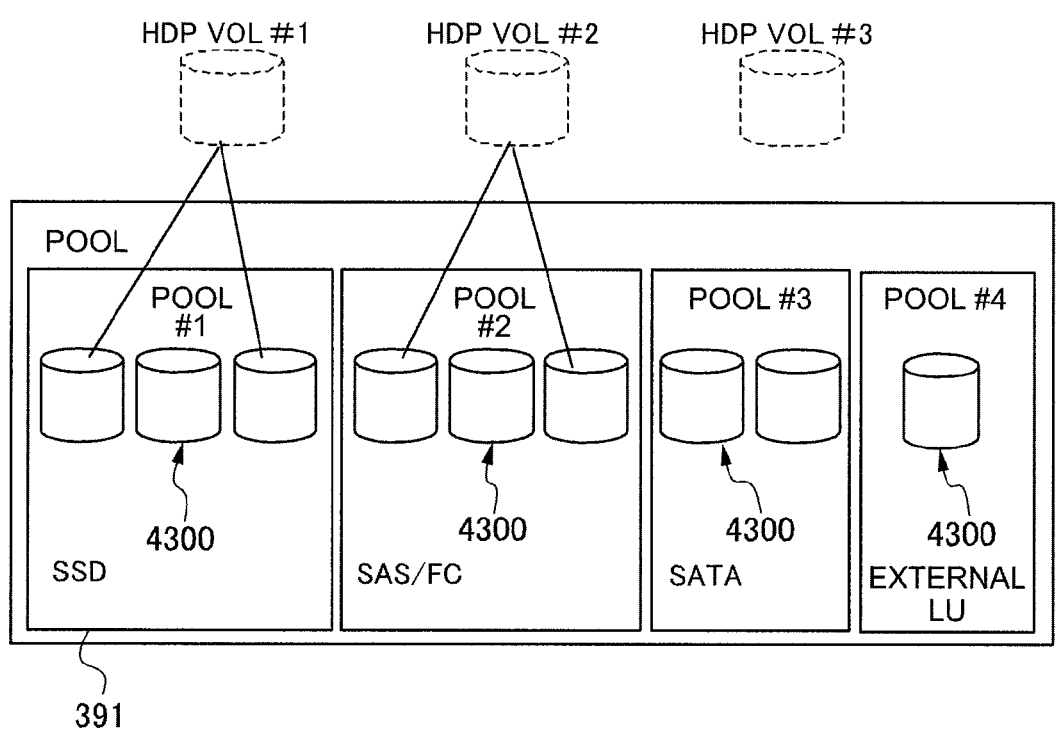
FIG. 44 is a block diagram of virtual volumes and pool volumes showing that "performance" showing the speed of the response to accesses from the host computer is added to the virtual volume attributes.

FIG. 44 shows another embodiment and is a block diagram showing the example that "performance" showing the speed of the response to accesses from the host computer is added to the virtual volume (HDP VOL) attributes. For example, in "performance," the identifiers such as "ultrahigh-speed," "high-speed," and "low-speed" are registered. For the pool volume attributes, this "performance" can also be set.

The administrative user considers the attribute of the virtual volume and sets the pool volumes for the virtual volume to match the attribute. For example, for the "ultrahigh-speed" virtual volume #1, the pool volumes created from SSDs are allocated. For the "high-speed" virtual volume #2, the pool volumes created from SASs and FCs are allocated.

For the "low-speed" virtual volume #3, the pool volumes created from SATAs are allocated. In other cases, virtual volumes to which the pool volumes of the external storage system may also be permitted. The storage system performs the rebalance in the range of SSD pool volumes. If SSD pool volumes are added, the virtual volume using the SSD pool volumes is rebalanced.

This method is based on the same concept as that of FIG. 43. In FIG. 43, grouping is performed in accordance with whether pool volumes are over multiple pools or not while, in FIG. 44, grouping is performed in accordance with the types of HDDs. In one pool, a group of SSDs (hereinafter referred to as the pool #1), a group of SASs and FCs (hereinafter referred to as the pool #2), and others exist. If a pool volume of SSDs (=HDDs) is added to the pool, the rebalance is performed inside the pool #1 in the pool and the other parts such as the pool #2 are not affected by it.

In the above-mentioned embodiment, if a pool volume is deleted from the pool, this pool volume is deleted from the page allocation order information management table, and therefore, no new page linked to the address of the virtual volume of this pool volume is allocated, but read accesses from the host computer are supplied to this pool volume until the pool volume is completely deleted from the pool.

The administrative user can set the rebalance on/off flag setting information in the control memory of the storage system via the service terminal or the maintenance device. If this setting information is turned on, the storage system does not perform the rebalance processing even if any trigger arises. This setting information can also be set for each pool or each virtual volume.

In the above-mentioned embodiment, the determination on the page rebalance trigger and the possibility of performing rebalance is performed by the storage system, but this can be performed by the service terminal. In the former case, the storage system is the computer system of this invention and, in the latter case, the combination of the service terminal and the storage system is the computer system.

What is claimed is:

1. A computer system, comprising:
a storage device including a plurality of storage areas;
a virtual volume to which access from a host system are permitted;
a plurality of logical volumes, each including a storage area, of the plurality of storage areas, and each being a pool volume of a pool; and
a controller which is configured to control allocation of a storage area from the plurality of pool volumes in the pool to the virtual volume on a storage area unit basis for storing data of a write request,
wherein the controller is configured to:
receive a request for a pool volume deletion;
specify at least one of the pool volumes which is to be deleted;
migrate data stored in the pool volume which is to be deleted to other pool volumes so as to balance a usage rate of each of the remaining pool volumes in the pool; and
change an allocation of a storage area, in the pool volume to be deleted, to the virtual volume, to an allocation of a storage area of the pool volume storing the migrated data to the virtual volume,
wherein the usage rate for each pool volume is a ratio of the storage areas allocated to the virtual volume among total storage areas of the pool volume which can be allocated to the virtual volume.

2. The computer system according to the claim 1, wherein the at least one of the pool volumes to be deleted is specified by the user input.

3. The computer system according to claim 1, wherein the controller is configured to specify the at least one of the pool volumes to be deleted based on a capacity to be deleted by input by the user.

4. The computer system according to claim 3, wherein the pool volume whose storage areas allocated to the virtual volume is less than other pool volumes is specified as the pool volume to be deleted.

5. The computer system according to claim 1, wherein the controller is configured to reject the pool volume deletion request, if a usage rate of the pool after the deletion of the at least one of the pool volumes to be deleted exceeds a predetermined value.

6. The computer system according to claim 1, wherein the controller is configured to:
detect an imbalance of the usage rate among the pool volumes;
migrate data stored in a pool volume with higher usage rate to other pool volumes with lower usage rate so as to balance the usage rate of each of the pool volumes among the pool volumes; and
change the allocation from the storage area in the pool volume with the higher usage rate to the virtual volume to an allocation from a storage area storing the migrated data in the pool volume with lower usage rate to the virtual volume.

7. The computer system according to claim 1, wherein the controller is configured to change allocation from the storage area storing a fixed pattern data to the virtual volume to an allocation from an exclusive area for storing the fixed pattern data to the virtual volume.

8. The computer system according to the claim 1, wherein the controller determines a pool volume whose storage area is to be allocated to the virtual volume based on a capacity of the each of the pool volumes in the pool.

9. The computer system according to claim 1, wherein the controller is configured to reject the pool volume deletion request, if the pool volume to be deleted is a current target of any process including I/O from a computer.

10. In a computer system having a storage device including a plurality of storage areas, a virtual volume to which access from a host system are permitted, a plurality of logical volumes, each including a storage area, of the plurality of storage areas, and each being a pool volume of a pool, and a controller which is configured to control allocation of a storage area from the plurality of pool volumes in the pool to the virtual volume on a storage area unit basis for storing data of a write request, a method performed by the controller comprising the steps of:
receiving a request for a pool volume deletion;
specifying at least one of the pool volumes which is to be deleted;
migrating data stored in the pool volume which is to be deleted to other pool volumes so as to balance a usage rate of each of the remaining pool volumes in the pool; and changing an allocation of a storage area, in the pool volume to be deleted, to the virtual volume, to an allocation of a storage area of the pool volume storing the migrated data to the virtual volume, wherein the usage rate for each pool volume is a ratio of the storage areas allocated to the virtual volume among total storage areas of the pool volume which can be allocated to the virtual volume.

11. The method according to the claim 10,
wherein the at least one of the pool volumes to be deleted is specified by the user input.

12. The method according to claim 10, further comprising the step of:
specifying the at least one of the pool volumes to be deleted based on a capacity to be deleted by input by the user.

13. The method according to claim 12,
wherein the pool volume whose storage areas allocated to the virtual volume is less than other pool volumes is specified as the pool volume to be deleted.

14. The method according to claim 10, further comprising the step of:
rejecting the pool volume deletion request, if a usage rate of the pool after the deletion of the at least one of the pool volumes to be deleted exceeds a predetermined value.

15. The method according to claim 10, further comprising the steps of:
detecting an imbalance of the usage rate among the pool volumes;
migrating data stored in a pool volume with higher usage rate to other pool volumes with lower usage rate so as to balance the usage rate of each of the pool volumes among the pool volumes; and
changing the allocation from the storage area in the pool volume with the higher usage rate to the virtual volume to an allocation from a storage area storing the migrated data in the pool volume with lower usage rate to the virtual volume.

16. The computer system according to claim 10, further comprising the step of:
changing allocation from the storage area storing a fixed pattern data to the virtual volume to an allocation from an exclusive area for storing the fixed pattern data to the virtual volume.

17. The method according to the claim 10, further comprising the step of:
determining a pool volume whose storage area is to be allocated to the virtual volume based on a capacity of the each of the pool volumes in the pool.

18. The method according to claim 10, further comprising the step of:
rejecting the pool volume deletion request, if the pool volume to be deleted is a current target of any process including I/O from a computer.

19. A computer system, comprising:
a storage device including a plurality of storage areas;
a virtual volume to which access from a host system is permitted;
a plurality of logical volumes each including a plurality of storage area units and constituting a plurality of pool groups; and
a controller for controlling allocation of the storage area units from the plurality of logical volumes in the plurality of pool groups to the virtual volume,
wherein the controller is configured to:
manage, for each of the plurality of logical volumes in at least in a first pool group among the plurality of pool groups, information regarding a capacity of each of the plurality of logical volumes and a number of storage area units allocated to the virtual volume;
allocate at least one storage area unit, which has not been allocated from the pool to the virtual volume, to the virtual volume when the host system accesses the virtual volume;
detect a state where an imbalance of a usage rate of the logical volumes in the first pool group of the at least one of the pool groups, which is determined based on the capacity of each of the plurality of logical volumes in the first pool group and the number of storage area units allocated to the virtual volume, occurs among the plurality of logical volumes in the first pool group; and
change the allocation of at least one storage area unit of one of the plurality of logical volumes in the first pool group allocated to the virtual volume to a storage area unit of another logical volume in the first pool group to balance the usage rate among the plurality of logical volumes in the at least one of the pool groups.

20. The computer system according to claim 19:
wherein the controller sets whether the balancing of the usage rate is to be performed to each of the plurality of pool groups.

* * * * *